Figure 1:
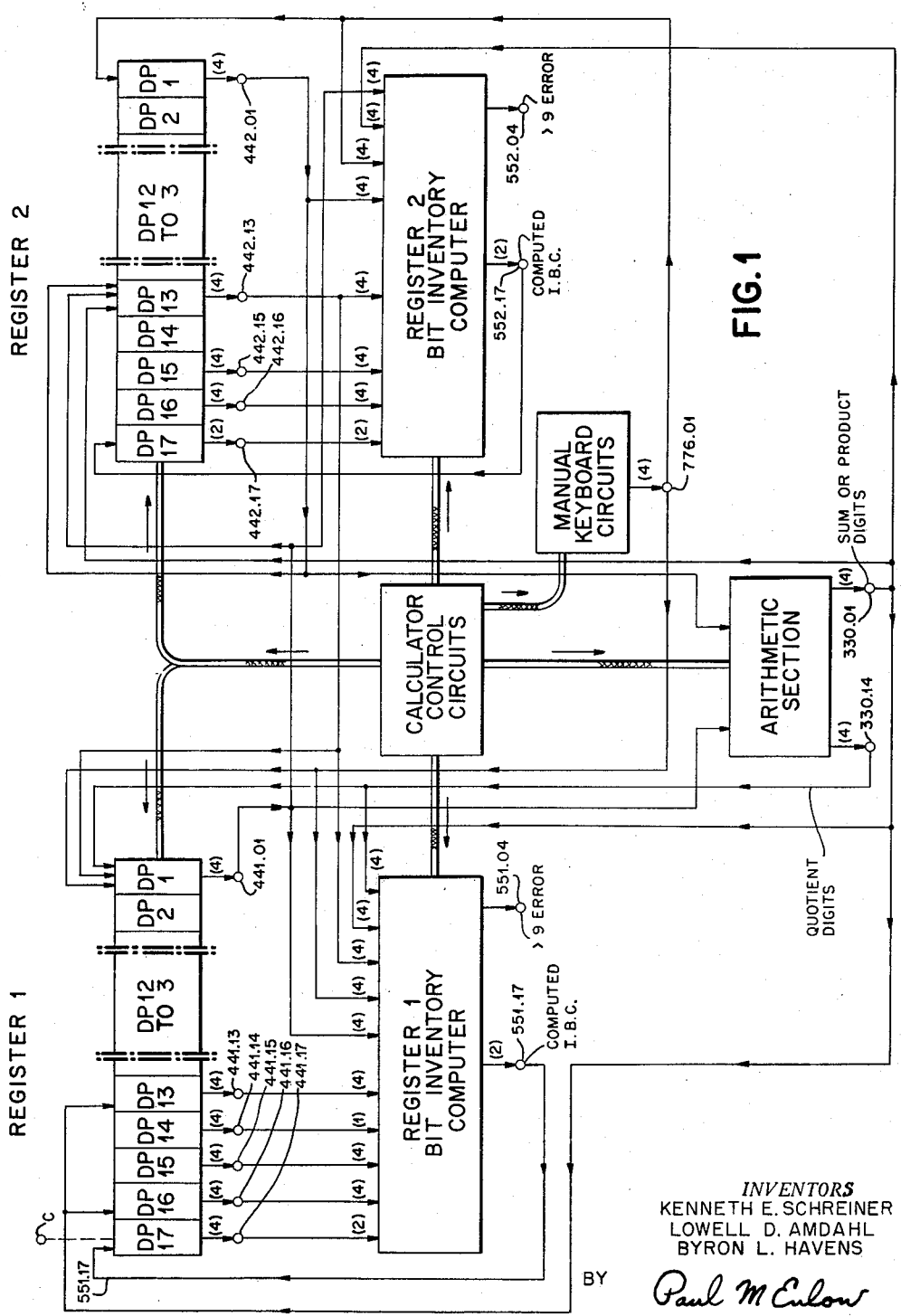

INVENTORS
KENNETH E. SCHREINER
LOWELL D. AMDAHL
BYRON L. HAVENS

BY Paul M Enlow
AGENT

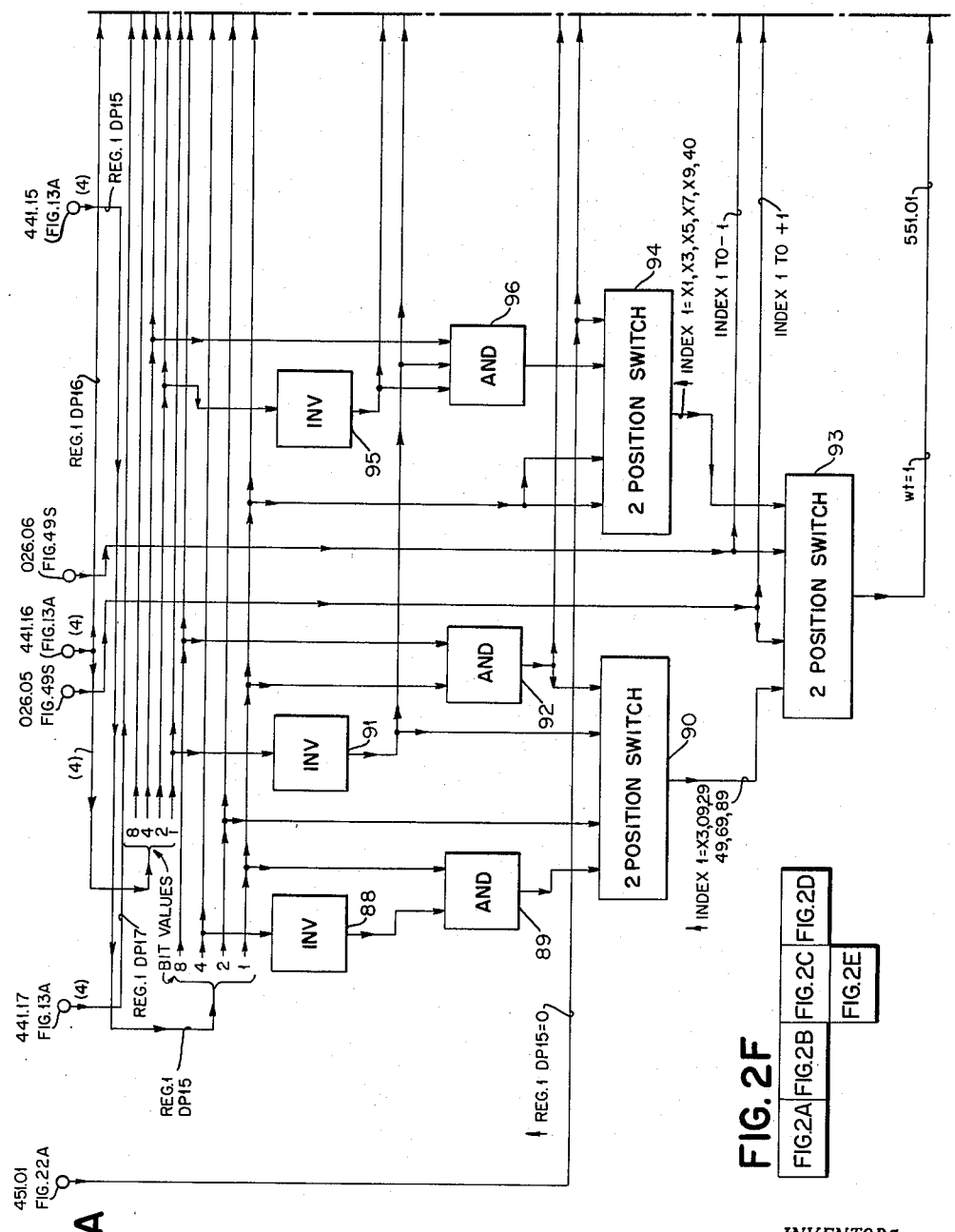

Sept. 27, 1960     K. E. SCHREINER ET AL     2,954,164
CHECK DIGIT MONITORING AND CORRECTING CIRCUITS
Filed Oct. 14, 1955     9 Sheets-Sheet 3

*INVENTORS*
KENNETH E. SCHREINER
LOWELL D. AMDAHL
BYRON L. HAVENS

BY Paul M Enlow

AGENT

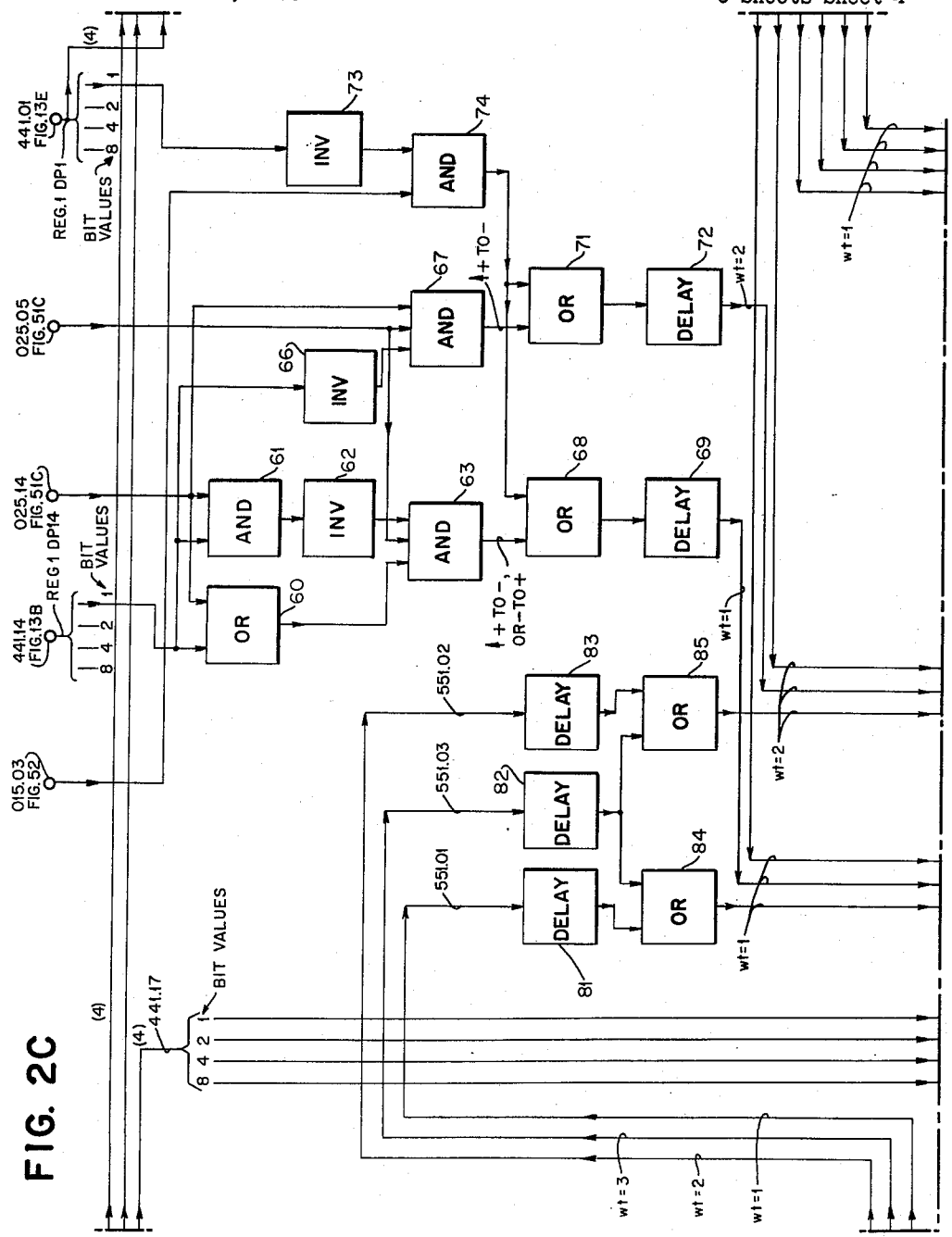

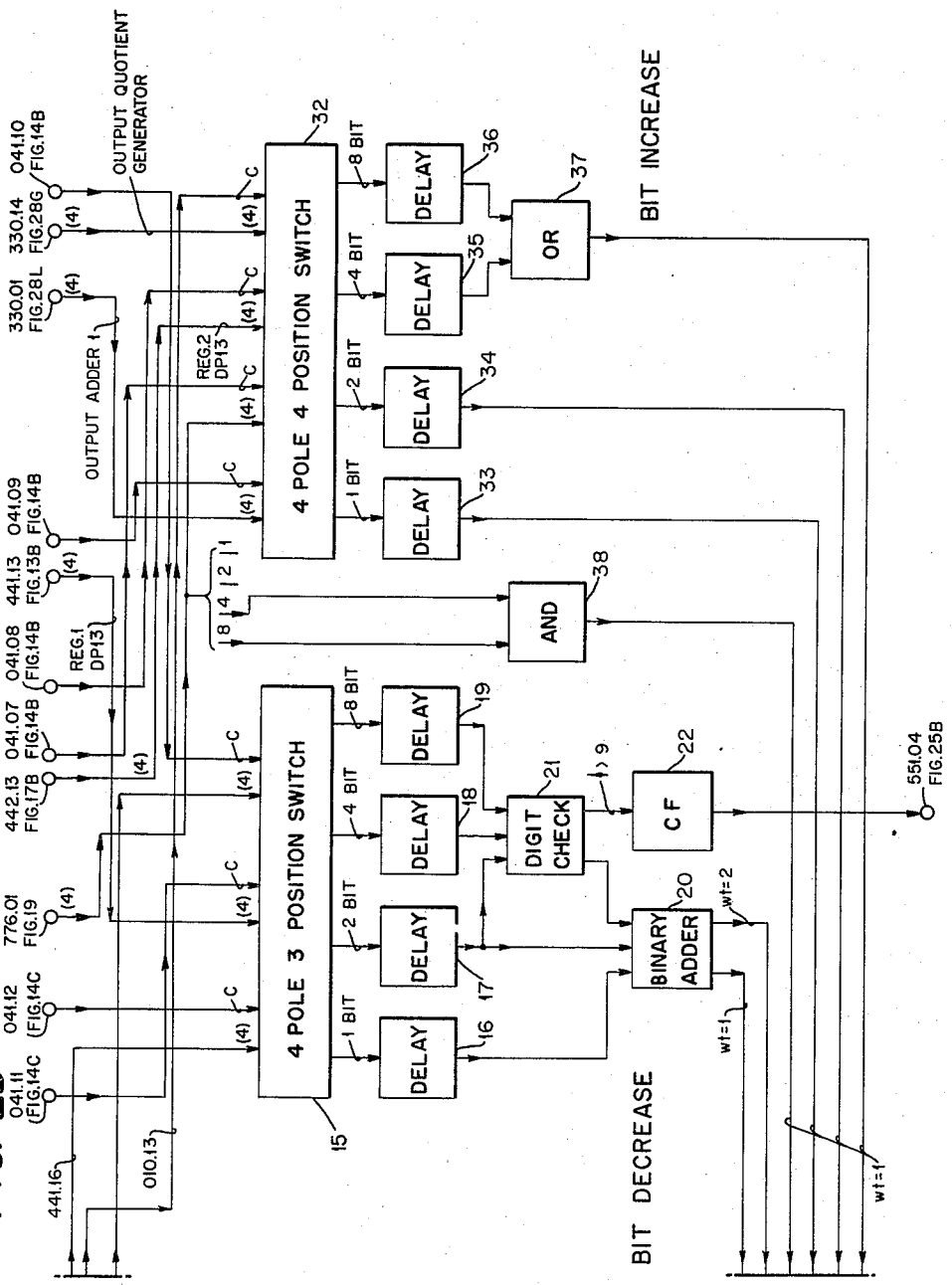

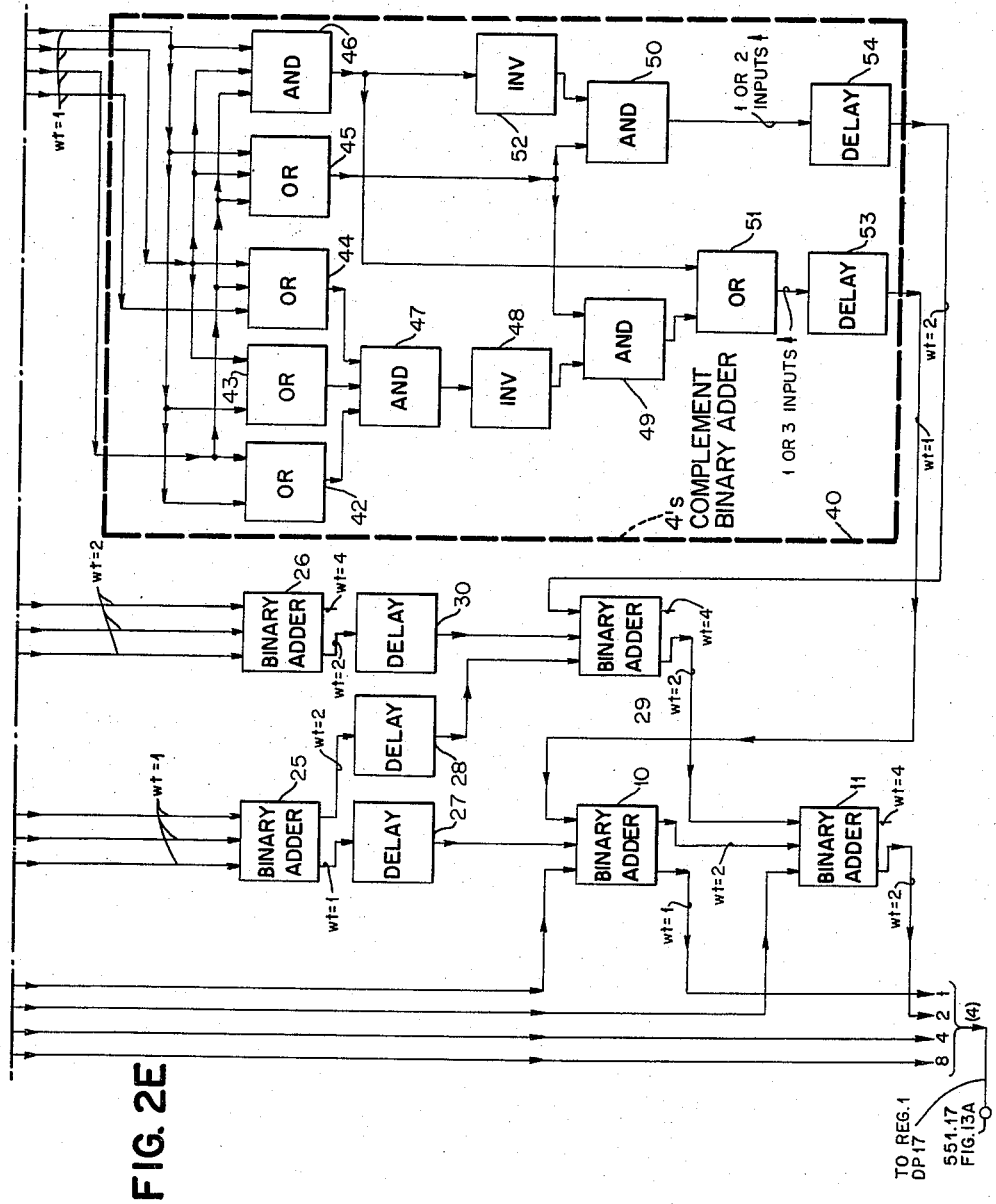

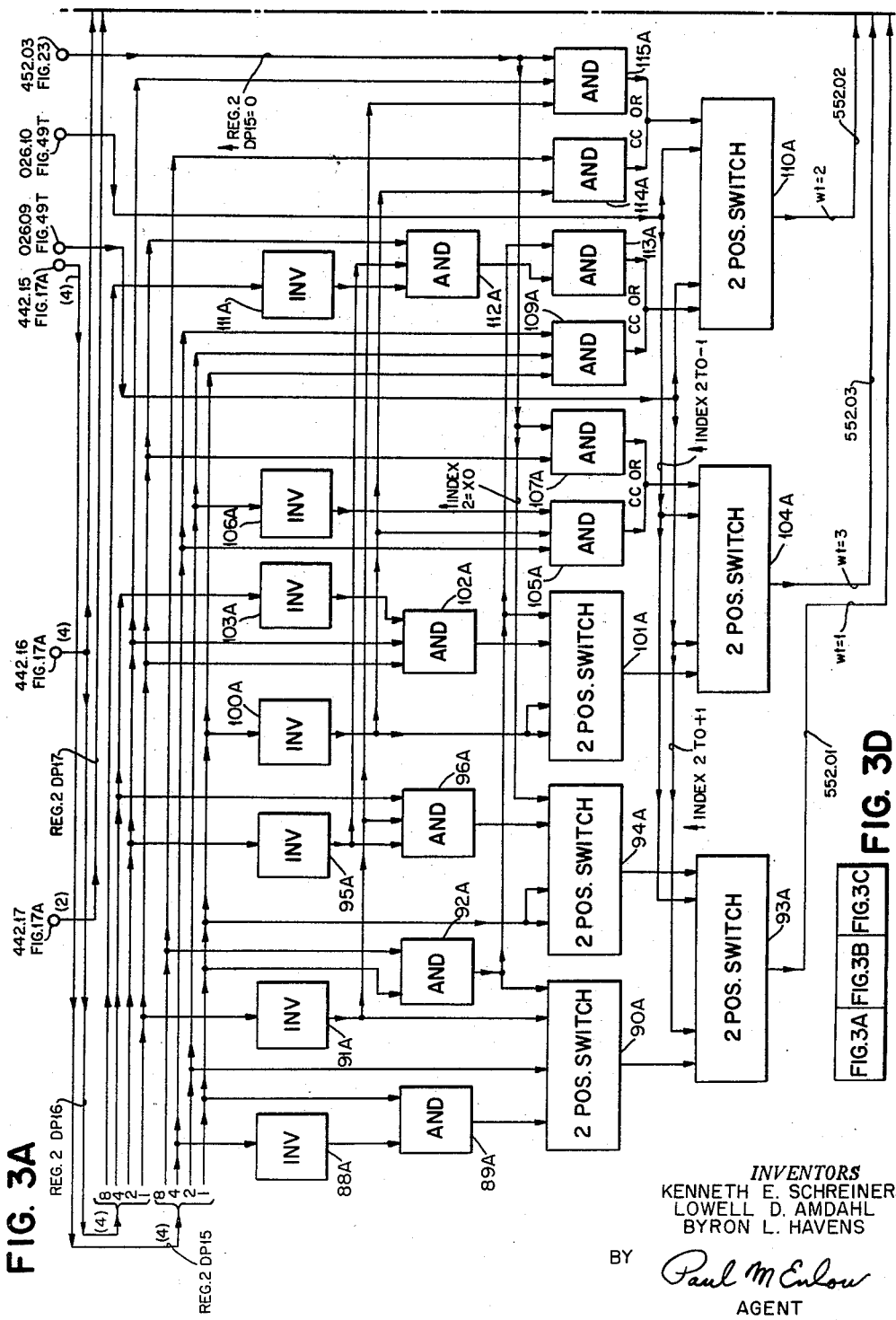

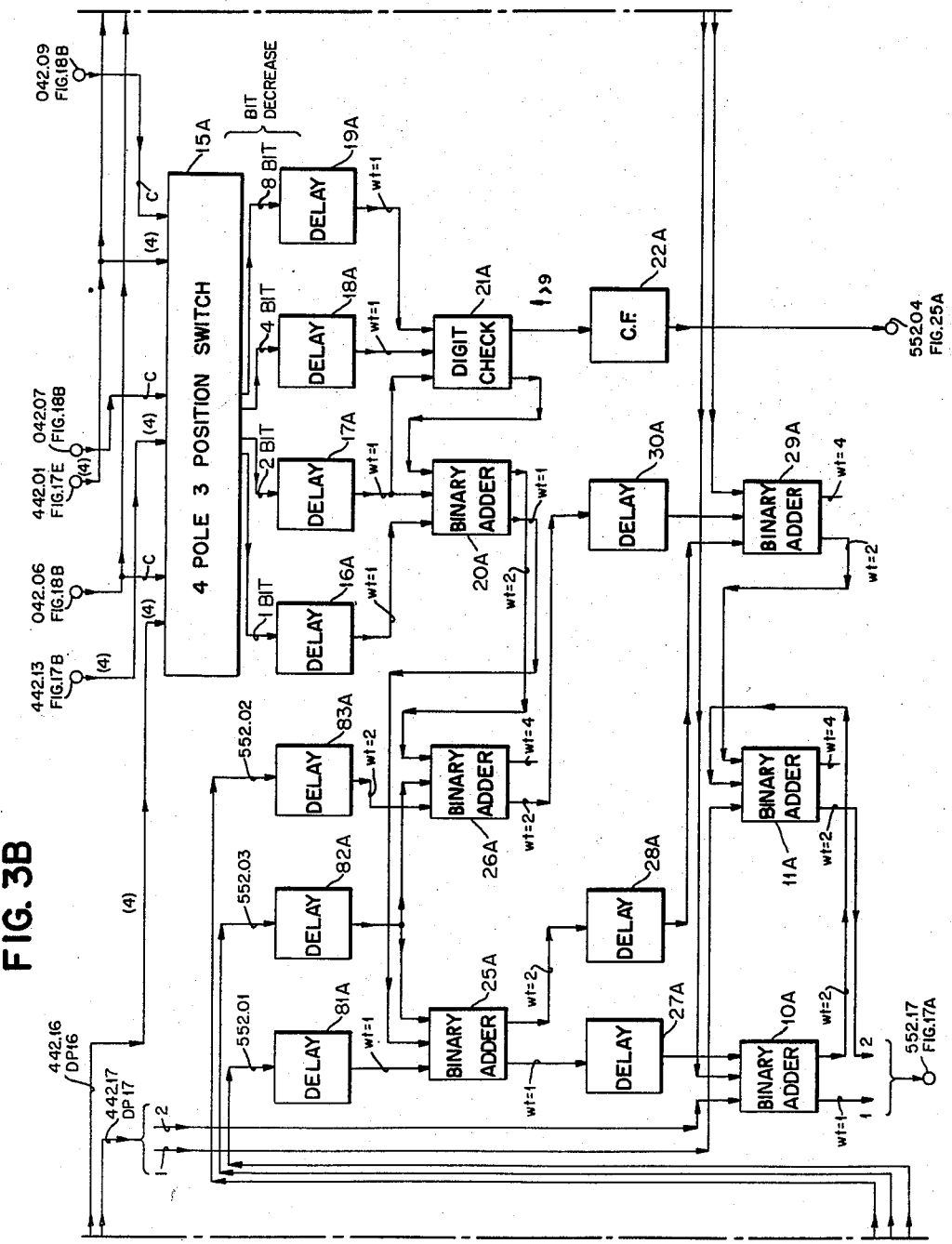

Sept. 27, 1960 K. E. SCHREINER ET AL 2,954,164
CHECK DIGIT MONITORING AND CORRECTING CIRCUITS
Filed Oct. 14, 1955 9 Sheets-Sheet 9

FIG. 3C

INVENTORS
KENNETH E. SCHREINER
LOWELL D. AMDAHL
BYRON L. HAVENS
BY Paul M Enlow
AGENT

United States Patent Office 2,954,164
Patented Sept. 27, 1960

2,954,164

CHECK DIGIT MONITORING AND CORRECTING CIRCUITS

Kenneth E. Schreiner, Harrington Park, N.J., Lowell D. Amdahl, Redondo Beach, Calif., and Byron L. Havens, Closter, N.J., assignors to International Business Machines Corporation, New York, N.Y., a corporation of New York Filed Oct. 14, 1955, Ser. No. 540,394

12 Claims. (Cl. 235—153)

This invention relates to electronic computers and more particularly to novel circuitry for maintaining a predetermined relationship between waveforms representing a check indicator and waveforms representing information by examining changes in the latter.

Within recent years, the electronic computer art has included various diagnostic "checking" systems and circuits, auxiliary to the main arithmetic computing apparatus, which serves to check the validity of a transfer of a group of electrical signals representing a plurality of digits from one component of the main computer to another. The plurality of digits represented by electrical signals are generally referred to as a "word" of information or a "data word." One generally known type of checking system includes the association of an electrical waveform representing a check digit or indicator with each group of electric waveforms representing a data word. The check digit waveform bears a predetermined relationship to the character of the signals representing the data word. A word is said to contain an error if, upon examination, the predetermined relationship between the check digit waveform and the word is found to be lacking.

Digital telemetering systems and computing machines frequently employ the binary system of notation wherein a group of information is represented by a plurality of discrete pulses. Each of these pulses is generally considered as representing a binary bit which may have a value of zero or 1. In the checking system referred to above wherein a check digit or indicator is associated with a data word, the check digit is generally determined through a mathematical process which includes a determination of the inventory of binary bits present in the data word. Thus when a word is transferred from one component of the computer to another, the accidental loss or gain of a binary bit destroys the predetermined relationship established between the inventory of binary bits present and the inventory check digit.

One difficulty inherent in the checking system referred to exists in the fact that each time one of the digits of a word is removed therefrom or a new digit is added thereto during the performance of an arithmetic process or other operation, the character of the check digit or indicator must be altered so as to correspond to the new composition of the data word. One method of creating the new check digit or indicator is to examine each and every digit of the word and compute therefrom a new check digit which is correlated with the word. However, this method is disadvantageous in that if the digits are examined simultaneously, i.e., in parallel, a large quantity of electronic equipment is required, or if the digits are examined sequentially, i.e., serially, a large amount of time is required which decreases the overall computing time of the calculator.

The present invention provides means for monitoring the waveforms representing the current check digit and also the waveforms representing information which is added to or removed from a data word and through an arithmetical process computes the new check digit which is substituted for the previous check digit. This process is performed without requiring that the unchanged portions of the data word be examined and thus represents a saving in time and electronic equipment.

Briefly, the invention disclosed herein provides circuitry for computing a new check digit to be associated with a data word in response to alterations made in said data word. Each check digit bears a predetermined relationship to the associated data word. This procedure is accomplished by first generating a correction factor from the alterations made in said data word without sensing the unchanged portions of said word. The correction factor is then added modulo 4 current to the check digit, and the result thereof is the new or corrected check digit.

The invention generates the correction factor by determining the net increase or net decrease of binary bits comprising the data word. Where a net bit increase occurs, the correction factor is equal to the 4's complement of the bit increase modulo 4. During certain operations, a bit increase and a bit decrease may occur simultaneously. In this even, a plurality of correction factors is added to the current check digit in order to obtain the corrected check digit.

Accordingly, one of the objects of the present invention is to provide a system whereby a new check digit is computed by arithmetically combining the current check digit and a correction factor derived from the changes in digital information manifested in the data word, without resorting to an examination of the unchanged portions of the word.

A further object is to provide a novel bit inventory computer for currently maintaining a predetermined relationship between a check indicator and a data word comprising a plurality of electrical signals representing binary 0's and binary 1 bits which are contained in a storage register.

Another object is to provide means for sensing digits discharged from a data word, obtaining the sum modulo 4 of the binary bits representing each such discharged digit, and thereafter combining said sum with the current check digit so as to obtain a further sum modulo 4 which is the corrected check digit.

A further object is to provide means for sensing digits added to a data word, obtaining the 4's complement of the sum modulo 4 of the number of binary bits representing said added digits, and means for adding these factors to the present check digit so as to obtain a further sum modulo 4 which is the new or corrected check digit.

It is also an object to provide a novel 4's complement binary adder for use in a bit inventory system.

A still further object is to provide an electronic bit inventory computing circuit for use with a shifting register.

Another object of the present invention is to provide an electronic computing circuit capable of simultaneously sensing binary bits added to and removed from a storage device, means for computing a correction factor determined from said added and removed bits, and circuit means for combining the correction factor and a check digit to produce a corrected check digit that is stored in said storage device.

Another object is to provide means for sensing a current check digit, means for monitoring the proposed increase or decrease of a binary decimal digit of a word by a value of one including means for computing a correction factor, and circuitry for combining said check digit and said correction factor to produce a corrected check digit indicative of the current digital composition of said word.

Other objects of the invention will be pointed out in the following description and claims and illustrated in the accompanying drawings, which disclose, by way of example, the principle of the invention and the best mode, which has been contemplated, of applying that principle.

Figure 2B:
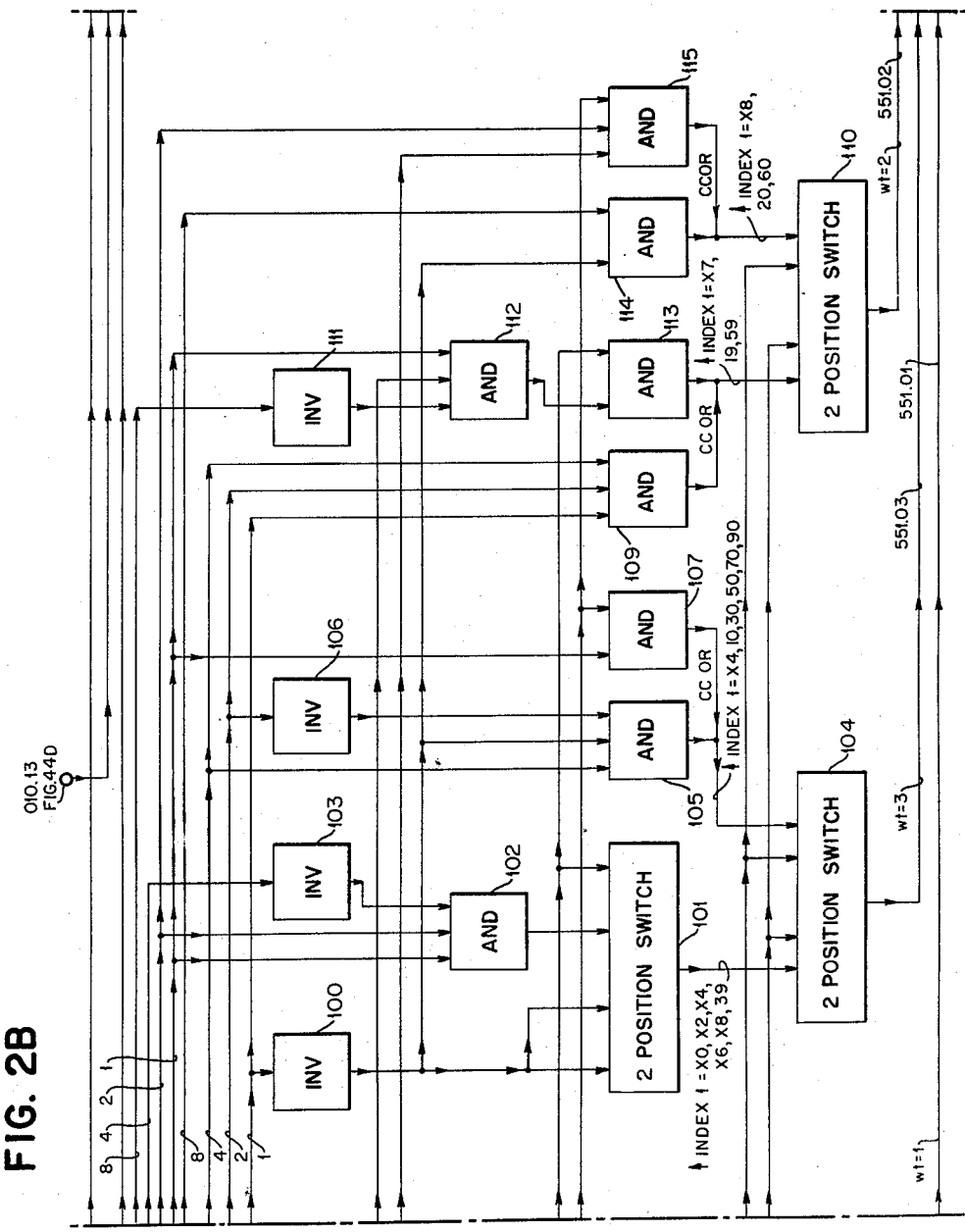

In the drawings:

Fig. 1 is a block diagram of a portion of an electronic computer which utilizes the invention;

Figs. 2A–2E when arranged as shown in Fig. 2F illustrate a circuit diagram, in block diagram form, of the bit inventory computer associated with Register 1; and Figs. 3A–3C when arranged as indicated by Fig. 3D show the circuit diagram, in block diagram form, of the bit inventory computer associated with Register 2.

The following U.S. patents and U.S. patent applications are referred to herein:

(1) Application Serial No. 547,981, filed November 21, 1955, entitled "Digital Computer," by Byron L. Havens et al.

(2) Application Serial No. 444,253, filed July 19, 1954, entitled "Electrostatic Storage System," by Deerhake et al.

(3) U.S. Patent Reissue 23,699, entitled "Pulse Delay Circuit," by Byron L. Havens, issued August 18, 1953, a reissue of U.S. Patent 2,624,839, issued January 6, 1953.

(4) Application Serial No. 434,548, filed June 4, 1954, entitled "Checking Circuit," by Deerhake et al.

(5) Application Serial No. 470,160, filed November 22, 1954, entitled "Electronic Multiplier-Divider," by Byron L. Havens.

(6) Application Serial No. 465,076, filed October 27, 1954, entitled "Checking Circuit," by Deerhake et al., now Patent 2,826,359, issued March 11, 1958.

(7) Application Serial No. 257,747, filed November 23, 1951, entitled "Digital Information Register," by Havens et al., now Patent 2,782,305, issued February 19, 1957.

(8) Application Serial No. 458,909, filed September 28, 1954, entitled "Counting Register," by Byron L. Havens, now Patent 2,910,240 issued October 27, 1959.

The specifications and subject matter of each of the U.S. patents and U.S patent applications listed above (except for application 1, Serial Number 547,981), are incorporated herein as part of this application as though they were fully set forth in the body of this specification. Each may be referred to hereinafter by the number immediately preceding its listing. For example, U.S. patent application Serial No. 444,253, filed July 19, 1954, entitled "Electrostatic Storage System," by Deerhake et al., is referred to as "application 2." Each of the above U.S. patents and U.S. patent applications is assigned to the assignee of the present application.

DEFINITIONS

In the following description of the invention, the binary decimal system of notation is used, where a decimal digit is represented by the presence of one or more of four binary bits which are assigned the values 1, 2, 4 and 8. For example, the digit 9 is written in binary decimal notation as 1001 where the extreme right-hand binary order represents a value of 1 when a binary 1 is present, and the extreme left-hand binary order represents a value of 8 when a binary 1 is present. Accordingly, the digit 49 is written in binary decimal notation as 0100 1001. Generally, the binary decimal system of notation as used herein precludes the representation of a decimal digit having a value greater than 9 by said four binary bits. However, in certain instances this rule is abrogate by representing a 10 by the simultaneous presence of binary 1's representing the 8 and 2 bits, and a 12 is represented by the simultaneous presence of an 8 and a 4 bit.

The term "digit position" frequently abbreviated as "DP" is used to refer to a digital order of a data word or of a device such as a register for accommodating or storing a single digital order of a word. Although a data word may contain any number of positions, the device disclosed herein is described with relation to data words having seventeen digit positions where DP1 through DP16 are occupied by decimal digits and DP17 is occupied by a check digit which is the indicated bit count factor referred to below.

The term "bit count" refers to the actual *number* of binary 1 bits which are present in a data word without regard to the decimal values 1, 2, 4 and 8 which are assigned to the individual bits. The term "indicated bit count" (sometimes abbreviated as IBC) is defined as the 3's complement of the bit count modulo 4 of the number of binary 1 bits in digit positions 1 through 16 of a data word. For example, if DP1–DP16 of a data word contains 19 binary 1 bits, the bit count is 19, the bit count modulo 4 is equal to 3 (the remainder after dividing 19 by 4), and the 3's complement of 3 is 0. Thus, in this example, the indicated bit count is zero so that a 0 should be located in DP17 of the data word.

Various circuits used herein or particular points within the circuits are frequently referred to as Up or Down. Up means that the voltage present at the particular point or at the output of the circuit designated is positive with respect to ground or higher than that provided when the point is Down. Down means that the voltage present at the particular point or at the output of the circuit designated is negative with respect to ground or below that provided when the circuit is Up. When a signal is Up, it is at approximately +10 volts, whereas it is Down when it is at approximately −30 volts.

An "AND" circuit is a logical coincidence type circuit component having a plurality of input terminals and a single output terminal. When all of the input terminals are Up simultaneously, the output terminal is Up. However, if one or more of the input terminals is Down, the output terminal must be Down. The circuit diagram of the AND circuits shown in the drawings of the present application may be similar to the circuit of Fig. 1C of application 2 set forth in the list hereinabove.

An "OR" circuit is a logical circuit component having a plurality of inputs and a single output wherein the output terminal is Up when one or more of the inputs thereof are Up. If all of the inputs of an OR circuit are Down, the output thereof is Down. The circuit diagram of the OR circuits used herein may be similar to the circuit of Fig. 1G of application 2 listed hereinabove.

The cathode follower circuit is a non-inverting circuit operable to produce a positive voltage at its output terminal whenever the input thereof has a positive voltage applied thereto. The cathode follower circuit of Fig. 1I of application 2 is typical of the circuit used in the present application. The cathode follower is normally used for isolation purposes or as a current driving unit when a particular signal source cannot supply the necessary current.

In the drawings of the present application, the abbreviation INV refers to an inverting circuit similar to the circuit of Fig. 1M of application 2 listed hereinabove. An inverting circuit produces a negative voltage pulse at its output terminal whenever a positive voltage pulse is applied to the input thereof.

The term Delay or Delay Circuit as used herein refers to any type of circuit having an input and an output whereby the application of a positive signal to the input causes the output thereof to be Up a predetermined time interval later. Although any type of delay circuit may be used in conjunction with the invention described hereinafter, a delay circuit of the type shown in Fig. 1 of application 3 listed hereinabove may be utilized.

The present invention utilizes numerous binary adders which may be of any general type having three input terminals, a sum output terminal and a carry output terminal. The binary adders used herein may be of the type illustrated in Fig. 6U of application 4 listed hereinabove. A binary adder performs binary addition whereby the presence of a single input pulse causes the output terminal to be Up, the presence of 2 input pulses simultaneously causes the carry output to be Up and the sum output to be Down, whereas the presence of three input pulses simultaneously causes both the sum and carry outputs of the adder to be Up. If each of the inputs is assigned a weight or decimal equivalent value of one, the sum output is assigned a weight of one and the carry output is assigned a weight of 2. Similarly, where each of the inputs is assigned a weight of 2, the sum and carry output terminals of the adder when Up are respectively assigned weights of 2 and 4, etc.

The invention described hereinafter utilizes a "digit check," the circuit diagram of which is illustrated in Fig. 6S of application 4. The digit check circuit has three inputs which respectively accommodate the 2, 4 and 8 bits of a binary decimal digit. A first output of the digit check circuits is Up whenever the information applied to the inputs thereof indicates that the value of the digit is greater than 9. A second output of the digit check circuit is Up whenever a 4 bit or an 8 bit is present. In other words, the digit check circuit performs two functions. First, it determines whether the digit applied to the inputs has a value greater than 9 and secondly, it combines the 4 and 8 bit terminals into a single terminal since a digit having a value of 9 or less is never represented by the simultaneous presence of an 8 bit and a 4 bit.

The present invention utilizes numerous electronic switches which are 4-pole multiposition switches. Each of the 4-pole multiposition switches is similar to the switch illustrated in Fig. 5 of application 5 listed hereinabove. Each position of a 4-pole switch includes four digit input terminals and a single control terminal. In order for the digit applied to the digit terminals to pass through the switch and appear at the output terminals thereof, the control terminal must be Up. The inputs of a switch are referred to herein as input 1, input 2 and so on, where input 1 is the extreme left-hand input. Similarly, the control terminals are referred to as control inputs 1, 2, 3, etc. which are associated with corresponding digit inputs.

In the following description various switches referred to as 2-position switches are utilized which are similar to the 2-position switch illustrated in Fig. 1X of application 6 listed above. Each position of a 2-position switch includes two input terminals, both of which must be Up simultaneously in order to cause the single output terminal of the switch to be Up.

The term "register" as used herein relates to any data storing means which is capable of storing a data word. The registers actually used in conjunction with the present invention are generally of the type illustrated in Fig. 2 of application 7 listed hereinabove.

1. INTRODUCTION

Referring more particularly to Fig. 1, a block diagram of a section of a digital computer which utiltizes the present invention is illustrated.

Registers 1 and 2 of Fig. 1 are generally of the type disclosed in application 7. Each of these registers is capable of storing simultaneously within each digit position a maximum of four binary bits having assigned values 1, 2, 4 and 8 representing a decimal digit. Positions DP1–DP16 of each register are normally occupied by numerical data, whereas DP17 is occupied by the indicated bit count which relates to the composition of said numerical data. For the purpose of ease of description of the present invention, it is assumed that at the time the data word was inserted into a register, the correct indicated bit count corresponding to this data word was inserted in DP17 thereof.

In Fig. 1, the inputs to the various digit positions of the registers are shown as entering the top of the block representing the register and the outputs of each position emerge from the bottom thereof. Adjacent to various leads is frequently seen a digit enclosed within parentheses as, for example (4), which means that the lead associated therewith actually represents four leads which accommodate the 1, 2, 4 and 8 bits which may represent a digit.

With respect to each of the digit inputs to the various positions of the registers, there is an associated control terminal which is generally not illustrated in Fig. 1. For example, in Fig. 1 the output terminals 551.17 (comprising two leads) constitute an input to DP17 of Register 1. Associated with this input is a single lead shown in dashed lines, which is connected to terminal C. In order for the digital information appearing on leads 551.17 to be entered into DP17 of Register 1, the control signal applied to terminal C must be Up. Although the control terminals associated with the remaining inputs to the various positions of the registers are not shown in Fig. 1, it is to be understood that in order for the information appearing on a set of digital inputs be entered into a digit position there is a corresponding control terminal to which a control signal must be applied. This control signal when Up gates the digital information into the respective digit position.

In general Registers 1 and 2 of Fig. 1 are individually capable of (1) accepting in parallel a data word via input terminals not shown, (2) right-shifting the contents of the register, (3) left-shifting the contents thereof, and (4) continuously storing a data word therein. In certain instances positions DP1–DP16 of either register may be right or left-shifted as a group whereas in other instances, DP1–DP13 may be right or left-shifted as a group.

Associated with each of the registers in Fig. 1 is a bit inventory computer, the function of which is to maintain the correct indicated bit count in DP17 of the associated register. As indicated hereinbelow, the indicated bit count may require alteration due to a loss or gain of binary bits as a result of inserting into the register new digits, removing digits therefrom, or changing the value of digits stored in the register. However, if one or more bits is accidentally lost or gained in a register due to the faulty operation of the register, the bit inventory computer associated therewith is not cognizant of the change in the composition of the register. When the word is transferred from one register to another it is subjected to a modulo 4 check by the circuit of application Serial No. 472,098, filed November 23, 1954 by Schreiner et al., now Patent Number 2,837,278, issued June 3, 1958, which will determine if the word contains an error as a result of an accidental loss or gain of binary bits. Thus, even though a bit inventory computer is not aware of an accidental loss or gain of bits in a word (resulting in an incorrect indicated bit count), the fact that such a word contains an error is detected by the parallel modulo 4 checking circuit.

Each of the bit inventory computers computes the new indicated bit count after taking cognizance of bits lost or gained in the associated register. Thus, in order to indicate to each of the bit inventory computers, the digits inserted in, removed from, or altered in the appropriate register, these digits are also applied to the bit inventory computers.

Referring again to Fig. 1, Register 1 is capable of receiving new digits via inputs to DP1, DP13 or DP16. During a division operation, each quotient digit appearing on terminals 330.14 is entered into DP1 of Register 1 and at the same time is applied to the Register 1 bit inventory computer. Each time a quotient digit is entered into Register 1, positions DP1–DP13 are left-shifted one digital order.

During certain other shifting operations, digits may be shifted out of DP13 of Register 2 into DP1 of Register 1. Each such new digit is applied to the Register 1 bit inventory computer during the same microsecond interval that it is applied to DP1.

By proper actuation of the manual keyboard circuits, a digit appears on terminals 776.01 which is applied simultaneously to DP1 of Register 1 and to the bit inventory computer.

During an addition, subtraction, conversion or multiplication operation, the sum or product digits appear on terminals 330.01 of the arithmetic section. As indicated in Fig. 1, each such digit is applied to the Register 1 bit inventory computer at the same time that it is entered into DP13 or in certain instances in DP16 of Register 1.

The previous several statements indicate a few ways in which Register 1 may receive new decimal digits.

Digits may be discharged from Register 1 by being right-shifted out of DP1, being left-shifted out of DP13, being left-shifted out of DP16, or by an alteration of the digits stored in DP14, 15 or 16. In Fig. 1 it is noted that the output of DP1 is connected to the Register 1 bit inventory computer. Thus, each digit that is right-shifted out of DP1 is applied to the bit inventory computer during the microsecond interval that the shift occurs. Similarly, digits left-shifted out of DP13 or DP16 are applied to the Register 1 bit inventory computer.

When Register 1 is storing a data word wherein the significant digits of the word are located in DP1–DP13, the algebraic sign of the significant digits is stored in DP14, and the index (power of 10 by which the significant digits must be multiplied so as to obtain their correct value) is stored in positions DP15 and DP16. Thus, whenever a change in the algebraic sign or a change in the index occurs, the digits which are removed from the register are each applied to the Register 1 bit inventory computer.

In a similar manner it is noted that Register 2 may receive new digits through DP1 or DP13. A digit appearing on terminals 776.01 as a result of the actuation of the manual keyboard may be entered into DP1 of Register 2. Under certain circumstances, digits being right-shifted out of DP1 are entered into DP13 of Register 2. All such digits entered into Register 2 are applied to the Register 2 bit inventory computer.

Under certain circumstances when positions DP1–DP13 of Registers 1 and 2 are being right-shifted simultaneously (as if they constitute a single 26-position register), digits right-shifted out of DP1 of Register 1 are entered into DP13 of Register 2. Finally, it is noted in Fig. 1 that digits appearing on terminals 330.01 may be entered into DP13 of Register 2. It is to be noted that each new digit entered into Register 2 by one of the means described is simultaneously applied to the Register 2 bit inventory computer.

Digits may be removed from Register 2 by being right-shifted out of DP1, left-shifted out of DP13 or left-shifted out of DP16 thereof. Each of the digits ejected from the register is applied to the Register 2 bit inventory computer. Also, the alteration of Index 2 which is stored in DP15 and DP16 of Register 2 causes the digits stored therein prior to alteration to be applied to the Register 2 bit inventory computer.

Briefly, each of the bit inventory computers of Fig. 1 examines the changes in digital information occurring within the associated register, monitors the current indicated bit count located in DP17 and from these facts a new indicated bit count is produced which is entered into DP17 two microseconds after the change occurred within the register.

There are in general, four ways in which the digital information stored in DP1–DP16 of a register may be changed so as to require that the indicated bit count stored in DP17 must be corrected so as to correspond to the new contents of the register. The first instance which requires that the indicated bit count be corrected, occurs when digits are shifted into or out of the register. Shifting of the register is accomplished in such a manner that digits are normally discarded or gained only in positions DP1, DP13 or DP16. The second circumstance which may occur in the register whereby the indicated bit count located in DP17 must be corrected arises when the algebraic sign of the word located in DP1–DP13 of the register is changed from plus to minus, or minus to plus. The algebraic sign of the word located in DP1–DP13 is stored in DP14 of the register. The third instance wherein the indicated bit count must be corrected arises in the case of a "rounding" operation. In the calculator, the contents of DP1–DP13 is rounded by forcing a binary 1 bit into the 1 bit position of DP1 of the register. If DP1 previously contained an even-valued number, the insertion of a binary 1 bit changes the digit stored therein to an odd value, thereby increasing the actual number of 1 bits stored in the register by 1. The fourth instance which will require a correction of the indicated bit count arises when the index of the word located in DP1–DP13 of the register is changed. The index is stored in DP15 and DP16 of each register and is defined as the power of 10 by which the word located in DP1–DP13 must be multiplied in order to obtain the correct value thereof. With reference to the index, the decimal point of the word stored in DP1–DP13 is arbitrarily assumed to be located between positions 13 and 12 of the register.

With respect to the above-mentioned four instances which require a correction of the indicated bit count, it is noted that each of these may cause an increase or a decrease in the actual number of bits stored in positions DP1–DP16.

In general, the Bit Inventory Computers described hereinafter operate in accordance with two rules. The first rule governs the case where a change in the contents of DP1–DP16 of the register results in a net increase of the bits (binary 1's) stored therein. Where there has been a net increase in the number of bits stored in a register, the indicated bit count located in DP17 is corrected by adding the 4's complement of the bit increase modulo 4 to the present indicated bit count so as to obtain a sum modulo 4 which is the new or corrected indicated bit count. For example, assume that a register has been reset so that initially DP1–DP16 each contain a zero and DP17 contains an indicated bit count of 3. If a digit 1 is shifted into DP1 from an outside source, the indicated bit count must be changed so as to reflect the current status of the register. By the definition of the indicated bit count, it is apparent that the new indicated bit count should be 2. The transition in the indicated bit count from 3 to 2 is accomplished by the invention disclosed hereinafter by adding the 4's complement of the bit increase modulo 4 to the initial indicated bit count, and the sum thereof modulo 4 is stored in DP17. In other words, the bit increase modulo 4 is 1 and the 4's complement of this is 3. The previous indicated bit count was 3 so that 3+3=6 which has a sum modulo 4 of 2. Thus the corrected indicated bit count is 2 which is entered into DP17 of the register by the circuits described hereinafter.

The second rule governs the situation where a net decrease in the number of binary 1 bits stored in a register has occurred. In this instance, the new or corrected indicated bit count is determined by adding the number modulo 4 binary bits which have been removed from the register to the present indicated bit count. The sum of these two factors, modulo 4 constitutes the new indicated bit count.

At this point it is well to point out the continuity provided by the checking circuits associated with a large calculator which includes the Register Bit Inventory Computers described herein, the Parallel Modulo 4 Checking circuit of application 4, and the Modulo 9 Computer described in Patent 2,837,278, mentioned above.

Consider, for example, the case where due to faulty operation of the register, a digit to be added thereto is not stored by the register but is applied to the bit inventory computer. In this case the bit inventory computer continuously causes the correct IBC to be stored in DP17 of the register, but due to the faulty operation thereof, this IBC no longer is in agreement with the actual contents of the register. With reference to Fig. 1 of the present application, whenever a word stored in a register is transferred in parallel to another register, or to another part of the calculator, it is transferred via a parallel transfer bus to which is connected the parallel modulo 4 checking circuit of application 4. When the word stored in the register which contains an error is applied to the parallel transfer bus, the parallel modulo 4 checking circuit immediately detects the error and thereafter causes the operation of the calculator to stop. Accordingly, the parallel modulo 4 checking circuit and a bit inventory computer provide a complete check on words stored in a register.

In Patent 2,837,278 referred to above, it is stated that the purpose of the modulo 9 computer is to check an arithmetic operation such as addition, subtraction, multiplication or division. The modulo 9 computer derives a check digit from each of the operands and also from the resultant sum, difference, product or quotient. These check digits are then combined according to a predetermined mathematical formula and the result thereof is examined to see if it is a 9. If said result is not a 9, the modulo 9 computer signifies that an error has occurred in the course of the mathematical computation. During the time intervals that the operands stored in Registers 1 and 2 of Fig. 1 are being shifted into the arithmetical section of the calculator, each bit inventory computer is continuously providing an IBC which corresponds to the contents of the register. Furthermore, as the resultant of the arithmetic operations is entered into Register 1, for example, the Register 1 bit inventory computer continues to provide the correct IBC. Accordingly, if the modulo 9 computer should indicate that an error has occurred during the arithmetic computation, the register bit inventory computer in combination with the parallel modulo 4 checking circuit conjointly determine if the IBC of the resultant operand and the bit contents of this operand are in agreement.

From the above, it is apparent that the enumerated checking circuits when employed in a large digital calculator provide complete and continuous checking facilities with respect to words transferred throughout the calculator.

The description which follows relates to the Register 1 bit inventory computer of Figs. 2A–2E and the Register 2 bit inventory computer of Figs. 3A–3C. They are each controlled by the control circuits of the main calculator which are not set forth herein. The description of the circuits of the invention merely sets forth the operation within each of the bit inventory computers in response to a timing control signal received from one of the calculator control circuits. In Figs. 2A–2E and 3A–3C, the designation (Fig. 17E), for example, indicates that the terminal associated therewith may be connected to the stated figure of application 1.

2. DATA CHANGES DUE TO SHIFTING REGISTER 1

Referring more particularly to Figs. 2A–2E, the output terminals 441.17 of DP17 of Register 1 are shown in Fig. 2A. When the present invention is to be employed with a register such as shown in application 1, these terminals are connected to Fig. 13A of application 1. The terminal 441.17 actually represents four terminals as indicated by the "4" in parentheses adjacent thereto. These four terminals connect to four leads which respectively accommodate the 1, 2, 4 and 8 bits of DP17 of Register 1. In Fig. 2C, the four leads connected to terminal 441.17 are shown as four individual leads so as to permit the description of the connection of these leads to the circuit components.

It should be noted that the leads of the group 441.17 of Figs. 2C and 2E which accommodate the 8 and 4 bits are connected directly to similarly labelled leads of the group 551.17. The latter terminals are connected as one of the inputs to DP17 of Register 1 as shown in Fig. 1. The indicated bit count currently stored in DP17 appears on terminals 441.17. The corrected indicated bit count computed by the circuit of Figs. 2A–2E appears on terminals 551.17 and thereby entered into DP17.

The 1 bit lead of the group of leads 441.17 of Figs. 2C and 2E is connected to input 1 of binary adder 10 of Fig. 2E. The left-hand output lead of this binary adder is the "sum" output and a pulse appearing thereon is assigned a weight of 1. This lead is connected to the 1 bit lead of the group 551.17. The right-hand output of binary adder 10 is the "carry" output and is assigned a weight of 2 when it is Up.

Similarly, the 2 bit lead of the group 441.17 is connected to input 1 of binary adder 11. The carry output of binary adder 10, also having a weight of 2, is connected to input 2 of adder 11. The left-hand output (sum) of adder 11 has a weight of 2 and is connected to the 2 bit lead of the group 551.17. It is to be noted that the right-hand output (carry) of adder 11 has a weight of 4 and is not connected to any circuitry. Accordingly, the sum modulo 4 of the signal (each having a weight of 2) applied to the three inputs of this adder is effected by disregarding the carry of 4. It is recalled that the indicated bit count is a sum modulo 4 and thus never attains a value greater than 3. Hence adder 11 of Fig. 2E obtains the sum modulo 4 of the inputs applied thereto.

Briefly then, the current indicated bit count is applied to binary adders 10 and 11 from the information appearing on terminals 441.17. It will be shown hereinafter that correctional factors, which are to be added to the current indicated bit count so as to obtain the new indicated bit count, are applied through various circuitry to inputs 2 and 3 of adders 10 and 11. Thus the corrected indicated bit count will appear on terminals 551.17.

Referring more particularly to Fig. 2D, the 4-pole 3-position switch 15 receives all digits shifted out of Register 1 which cause a net decrease in the number of binary bits retained in DP1–DP16 of the register. Each of the three inputs to switch 15 constitute four digital inputs (each shown as a single line) and also a control input bearing the designation "C." In order for the digit applied to one of the digital inputs to pass through the switch and appear at the output terminals thereof, the associated control terminal must be Up. In Fig. 2D the outputs of switch 15 are shown as four leads which respectively accommodate, from left to right, the 1, 2, 4 and 8 bits.

The outputs of DP16 of Register 1 of Fig. 1 appear on terminals 441.16 of Fig. 2A and are applied to input 1 of switch 15. When control terminal 041.12 of Fig. 2D is Up, the digit appearing on terminals 441.16 is permitted to pass through the switch and appear on the output terminals thereof. In general, terminal 041.12 is Up whenever a decimal digit is being left-shifted out of DP16 of Register 1 (see Fig. 1).

The output of DP13 of Register 1 appears on terminals 441.13 which are connected to input 2 of switch 15. In order for the digit appearing on these terminals to appear at the output of the switch, the control signal on terminal 041.11 must be Up. Terminal 041.11 is Up when DP1–DP13 of the register is left-shifted (DP14–DP16 not shifted). A digit may be shifted out of DP13 resulting in a net decrease in the 1 bits stored in the register.

Digits may also be removed from Register 1 by being right-shifted out of DP1. The output of DP1 appears on terminals 441.01 of Fig. 2C which are applied to input 3 of switch 15. The digit appearing on terminals 441.01 is gated through switch 15 only when the control signal on terminal 041.10 is Up. This control signal is Up when Register 1 is right-shifted.

When one of the control terminals 041.12, 041.11 or 041.10 is Up, it is Up one microsecond for each digit that is discharged from the register. The pulse applied to a control terminal may be Up continuously for three microseconds, for example, during which three digits are discharged from Register 1. However, only one of these control signals is Up during any given microsecond interval.

The 1, 2, 4 and 8 bit output leads of switch 15 are respectively connected to delay circuits 16–19 which serve to shape and re-establish the potential levels of the pulses emerging from the switch. Each of these delay circuits delay the signal applied thereto one microsecond. The output of delay 16 is connected to input 1 of binary adder 20, and the output of delay 17 is connected to input 2 of this adder. The outputs of delay circuits 17, 18 and 19 are respectively connected to inputs 1, 2 and 3 of the digit check circuit 21. The circuit diagram of the digit check circuit is disclosed in Fig. 6S of application 4 and is described therein. Briefly, the right-hand output of digit check 21 is Up if the input information represents a digit having a value greater than 9. This signal is applied through cathode follower 22 to terminal 551.04. The left-hand output of digit check 21 is Up when a pulse representing a 4 bit (from delay 18) or an 8 bit (from delay 19) is present. This is permissible since in the binary-decimal notation system, a digit having a value of 9 or less never contains an 8 *and* a 4 bit simultaneously. The output of digit check circuit 21 representing the 4 or 8 bit is applied to input 3 of binary adder 20.

The second rule recited hereinbefore states that the corrected indicated bit count is determined by obtaining the sum modulo 4 of the number of bits removed from the register and the present indicated bit count. Thus since the bits removed from the register are to be counted individually, i.e., they are now each assigned a weight of 1 and their former designations whereby they represented a 1, 2, 4 or 8 bit have no further meaning. Thus each of the inputs to adder 20 is assigned a weight of 1, the sum output of the adder has a weight of 1 when it is Up, and the carry output has a weight of 2 when Up. The sum output of adder 20 is applied to input 3 of adder 25 of Fig. 2E, and the carry output is applied to input 3 of adder 26 of Fig. 2E.

Adder 25 accommodates pulses each having a weighted value of 1, whereas adder 26 accommodates pulses having a weight of 2 each. The sum output of adder 25 (weight equals 1) is applied to delay circuit 27, the output of which is applied to input 2 of adder 10. The carry output of adder 25 (weight of 2) is applied to delay 28, and the output of the delay is applied to input 1 of adder 29. The sum output of adder 26 (weight of 2) is applied to delay 30 which delays a pulse applied thereto one microsecond and thereafter applies said pulse to input 2 of adder 29. The carry output of adder 26 is not used since it has a weight of 4. That is, adder 26 obtains a sum modulo 4 of the pulses representing weighted values of 2 each, which are applied thereto.

Consider briefly, an example of the operation of the circuitry discussed thus far. Assume that Register 1 initially contains nineteen binary bits so that the indicated bit count stored in DP17 (and appearing on terminals 441.17) is a 0. Consider further, that the digit 6 is shifted out of Register 1 such that the 4 and 2 bit output leads of switch 15 (Fig. 2D) are Up for one microsecond and the 1 and 8 bit leads are Down. That is, two bits have been discharged from the register. Accordingly, inputs 2 and 3 of adder 20 are Up one microsecond after the digit is discharged from the register. The summation occurring within adder 20 causes the sum output lead to be Down and the carry output leads (weight of 2) to be Up. This causes input 3 of adder 26 (Fig. 2E) to be Up. Let it further be assumed in the present example, that all the inputs of adder 25 and also inputs 1 and 2 of adder 26 are Down. The summation within adder 26 causes the sum output having a weight of 2 to be Up thereby energizing delay circuit 30. One microsecond thereafter the output of delay 30 goes Up applying a positive signal to input 2 of adder 29. Assuming that input 3 of adder 29 is Down, under the conditions assumed the sum output lead of this adder is Up, and the carry output is Down. Accordingly, input 3 of adder 11 is Up and inputs 1 and 2 thereof are Down. The summation within adder 11 causes the sum output lead to be Up and the carry output lead to be Down. Thus the 2 bit lead of the group 551.17 is caused to be Up for one microsecond, whereas the 1, 4 and 8 bit leads of this group are Down. Since the previous indicated bit count in this example was 0, input 1 of adders 10 and 11 were both Down. The corrected indicated bit count appearing on terminals 551.17 is 2. The correctness of this value can be checked by applying the definition of the indicated bit count, considering that the register now contains 17 binary bits (i.e., 3's complement of 17 modulo 4 is 2).

Due to the group of delays 16–19 (Fig. 2D) and delays 27, 28 and 30 (Fig. 2E) a lag of two microseconds exists between the time interval that a condition occurs within the register requiring a correction of the indicated bit count and the actual correction thereof.

Consider now situations arising where the number of bits contained within Register 1 is increased due to the entry of a digit into the register. Digits which are inserted into Register 1 are also applied to 4-pole 4-position switch 32 of Fig. 2D. The operation of this switch is similar to that of switch 15. In order for a digit to be gated through switch 32, one of the control terminals 041.09, 041.07, 041.08 or 010.13 must be Up. Only one of these terminals is Up during any given microsecond interval.

Referring to Fig. 2D, terminals 330.01 which are an output of the Arithmetic Section of Fig. 1, are connected to input 1 of switch 32. A digit appearing on terminals 330.01 is gated through switch 32 when terminal 041.09 is Up. This terminal is generally Up whenever a sum or product from the Arithmetic Section is shifted into Register 1, digit by digit.

Terminals 776.01 of Fig. 2D are connected to a manual keyboard entry circuit of Fig. 1, and a digit entered into Register 1 from the keyboard appears on these terminals. Although the circuit of Figs. 2A–2E generally accommodates digits not greater than 9, it is possible, in certain instances, to enter the characters 10 or 12 into Register 1 from manual keyboard. The character 10 is represented in a single digit position by an 8 bit and a 2 bit, whereas a 12 is represented by an 8 and a 4 bit in a single digit position. In order to gate a digit appearing on terminals 776.01 through switch 32, terminal 041.07 must be Up for one microsecond.

A digit stored in DP13 of Register 2 (see Fig. 1) appears on terminals 442.13 of Fig. 2D which are connected to input 3 of switch 32. When terminal 041.08 is Up for one microsecond, the digit appearing on terminals 442.13 is passed through switch 32 and appears at the output thereof. The control signal on terminal 041.08 is Up when a digit is left-shifted out of DP13 of Register 2 into DP1 of Register 1. This occurs when the lower thirteen orders of Registers 1 and 2 are being shifted together simultaneously as a 26-position register.

A digit emerging from the Arithmetic Section of Fig. 1 as a quotient appears on terminals 330.14 of Fig. 2D from which it is applied to input 4 of switch 32 at the same time that it is entered into DP1 of Register 1. Terminal 010.13 of Fig. 2B is Up one microsecond as each digit of the quotient is entered into Register 1. Thus during each microsecond that this control signal is Up, a digit is permitted to pass through switch 32.

In Fig. 2D, the output leads of switch 32 which accommodate the 1, 2, 4 and 8 bits of a digit applied to the switch are respectively connected to delay circuits 33–36. The outputs of delay circuits 35 and 36 are respectively applied to inputs 1 and 2 of OR circuit 37. The output of this OR circuit is Up one microsecond after an 8 or a 4 bit is applied to switch 32. It was stated above that a digit entered into Register 1 from the manual keyboard of Fig. 19 of application 1 appears on terminals 776.01. The 8 and 4 bit leads of terminals 776.01 are respectively connected to inputs 1 and 2 of AND circuit 38 of Fig. 2D. Thus if the character 12 is entered into Register 1 from the keyboard, the output of AND circuit 38 is Up, and at the same time the output of OR circuit 37 is Up.

Briefly, the output of delay circuit 33 is Up when a new digit entered into Register 1 contains a 1 bit, the output of delay circuit 34 is Up when a 2 bit is present, the output of OR circuit 37 is Up when the digit includes a 4 or an 8 bit, and the output of AND circuit 38 is Up whenever the digit on terminals 776.01 contains an 8 *and* a 4 bit.

The outputs of delays 33 and 34, OR circuit 37, and AND circuit 38 are connected to inputs of the 4's complement binary adder 40 of Fig. 2E. Since the new indicated bit count is evaluated in part by determining the number of bits added to the contents of Register 1 (i.e., the net bit increase resulting from the insertion of a digit), the output of each of the delay circuits 33 and 34, OR circuit 37, and AND circuit 38 have a weighted value of 1. The 1, 2, 4 and 8 bit designations previously assigned to these signals no longer are significant. Hence, each input to the 4's complement binary adder has a weighted value of 1.

The purpose of the 4's complement binary adder of Fig. 2E is to satisfy part of the first rule proclaimed hereinbefore stating that the corrected indicated bit count is formed by obtaining the sum modulo 4 of the 4's complement of the net bit increase and adding it to the existing indicated bit count. Adder 40 effects a sum of the input signals (derived from units 33, 34, 37 and 38) and produces the 4's complement of this sum which is applied to binary adders 10 and 29 of Fig. 2E. For example, if one of the inputs of the 4's complement binary adder 40 is Up, the sum of the weighted values applied to the adder is 1 and the 4's complement of this sum is 3. Thus, one output of adder 40 having a weighted value of 1 is Up at the same time that a second output of weight 2 is Up, thereby giving a total weighted value of 3.

The output of delay 33 (Fig. 2D) is connected to an input of each of the OR circuits 42, 44 and 45, and also to input 1 of AND circuit 46 (Fig. 2E). The output of delay 34 is connected to an input of each of the OR circuits 43, 44 and 45, and to input 2 of AND circuit 46. The output of OR circuit 37 is connected to an input of each of the OR circuits 42, 43 and 45, and also to input 3 of AND circuit 46. The output of AND circuit 38 of Fig. 2D is connected to input 1 of OR circuit 44.

With respect to the outputs of delay 33 and 34 and OR circuit 37 (Fig. 2D), it is apparent that if 2 or 3 of these outputs are Up simultaneously, each of the OR circuits 42, 43 and 44 (Fig. 2E) are operated so that their outputs are Up. Also, when the character 12 appears on terminals 776.01 of Fig. 2D, the outputs of AND circuit 38 and OR circuit 37 (Fig. 2D) are Up. Thus, when a 12 appears on terminals 776.01, each of the OR circuits 42–44 of Fig. 2E is operated.

The energization of each of the OR circuits 42–44 causes all of the inputs of AND circuit 47 to be Up simultaneously so that a positive signal is applied to inverter 48. This signal renders inverter 48 fully conductive and the output thereof is Down. Input 1 of AND circuit 49 receives the output of inverter 48.

The output of OR circuit 45 is Up when one or more of the inputs from 33, 34, and 37 to the 4's complement binary adder 40 are Up. This signal is applied to inputs 2 and 1, respectively, of AND circuits 49 and 50. It was noted above that the output of inverter 48 is DOWN when two or more signals, each of weight 1, are applied to the 4's complement adder 40. Accordingly, both of the inputs of AND circuit 49 are Up simultaneously only if one signal is applied to adder 40.

Coincidence occurs within AND circuit 46 when the digit applied to switch 32 of Fig. 2D contains three binary bits (including both the 1 and 2 bits detected from the outputs of 33 and 34). The output of this AND circuit is applied to input 2 of OR circuit 51. Hence, the output of OR circuit 51 is Up if only one or if three of the inputs to the 4's complement binary adder are Up.

The output of AND circuit 46 is also applied to inverter 52, and the output of this inverter is applied to input 2 of AND circuit 50. Since the output of inverter 52 is Up only when three inputs are *not* simultaneously applied to the 4's complement adder and since the output of OR circuit 45 is Up when one or more of the inputs of adder 40 are Up, both of the inputs of AND circuit 50 are Up to establish coincidence therein only if one or two of the inputs to adder 40 are Up. The outputs of OR circuits 51 and AND circuit 50 are respectively connected through delays 53 and 54 to inputs 3 of binary adders 10 and 29. A signal at the output of delay circuit 53 has a weight of 1, whereas a signal at the output of delay circuit 54 bears a weight of 2.

Reviewing briefly the function of the 4's complement binary adder 40 of Fig. 2E, it is apparent that when one or two of the inputs to the adder (each of weight 1) are Up, the output of delay circuit 54 representing a weight of 2 is Up. However, when one or three of the inputs to the adder (each of weight of 1) are Up simultaneously, a positive signal appears at the output of delay circuit 53 which has an equivalent weight of 1. If pulses having a total weight of 1 or 3 are applied to the adder, the 4s' complement thereof is respectively 3 (weight 1+weight 2) or 1 (weight of 1). Since both of these values include a weight of 1 the output of delay 53 must be Up. Similarly, when pulses having a total weight of 1 or 2 are applied to the adder, the 4's complement thereof is respectively 3 (weight 1+weight 2) or 2 (weight 2) which indicates that the output of delay circuit 54 must be Up under these conditions.

The signal appearing at the output of delay 53 is combined within adder 10 with other signals each having a weight of 1, whereas the signal at the output of delay 54 is combined within adder 29 with other signals each having a weight of 2.

Here again, it should be noted that a time delay of two microseconds is injected between the time a digit is applied to switch 32 (Fig. 2D) and the time that the corrected indicated bit count appears on terminals 551.71 due to the group of delay circuits 33–36 and delay circuits 53 and 54.

3. ALGEBRAIC SIGN CHANGES IN REGISTER 1

Another instance in which the number of bits stored in Register 1 may be changed occurs when the algebraic sign stored in DP14 of the register is changed from plus to minus or from minus to plus. When an algebraic sign is being stored in DP14, a positive sign is represented by the storage of a 0 (each of the output leads accommodating the 1, 2, 4 and 8 bits are Down) whereas a negative sign is indicated by storing a 1 in DP14 (1 bit lead is Up while the 2, 4 and 8 bit leads are Down). It is apparent then that the change in algebraic sign affects only the 1 bit order of DP14, and a change in sign can at most increase or decrease the number of bits stored in Register 1 by 1. Where the change in sign results in an increase of bits in the register, the new indicated bit count is derived by adding the quantity 3 (4's complement of 1) to the current indicated bit count, whereas a decrease in the number of bits in the register requires that the new indicated bit count be obtained by adding a 1 to the current indicated bit count.

The number of bits stored in Register 1 is increased by 1 when the algebraic sign is changed from plus to minus, and the number of bits is decreased by 1 when the sign is changed from minus to plus.

Referring more particularly to Fig. 2C, the algebraic sign currently stored in DP14 of Register 1 is manifested by the condition of the 1 bit terminal of the group 441.14. If this terminal is Down, DP14 is storing a positive sign whereas it is storing a negative sign when said terminal is Up. Terminal 025.14 of Fig. 2C bears the new sign which is to be entered into DP14 and is Up only when the new sign is negative. Terminal 025.14 supplies a sign control signal which is Up only when the new algebraic sign appearing on terminal 025.14 is to be inserted into DP14 of Register 1.

In Fig. 2C inputs 1 and 2 of OR circuit 60 are respectively connected to the 1 bit lead of the group 441.14 and terminal 025.14. Thus, the output of OR circuit 60 is Up when either the current algebraic sign or the new sign to be inserted into Register 1 is negative. The 1 bit lead of terminals 441.14 and terminal 025.14 are also connected to inputs 1 and 2 respectively of AND circuit 61. Thus, the output of this AND circuit is Up only when *both* the current and the new algebraic signs are negative (i.e., represented by binary 1 bits). The output of AND circuit 61 is inverted by inverter 62 and then applied to input 3 of AND circuit 63. Inputs 1 and 2 of AND circuit 63 are respectively connected to the output of OR circuit 60 and to terminal 025.05. Coincidence occurs within AND circuit 63 when either the current of the new algebraic sign is represented by a binary 1, but not both of them. That is, the output of this AND circuit is Up whenever the algebraic sign located in DP14 is to be changed from plus to minus or minus to plus. The signal appearing on terminal 025.05 is Up for only one microsecond. Thus, when the output of AND circuit 63 is Up, it remains Up for only one microsecond.

The signal present on the 1 bit lead of terminals 441.14 is inverted by inverter 66 and applied to input 1 of AND circuit 67. Inputs 2 and 3 of this AND circuit are respectively connected to terminals 025.05 and 025.14. Accordingly the output of AND circuit 67 is Up for one microsecond only when the current sign is positive (0 stored in DP14) and the new sign to be inserted into DP14 is negative (terminal 025.14 is Up).

Since the output of AND circuit 63 is Up when the sign is changed from plus to minus or from minus to plus, this signal is assigned a weight of 1. Since the ouput of AND circuit 67 is Up only when the sign is changed from plus to minus, this signal is assigned a weight of 2. These statements are in accordance with the previous statements that when the change in algebraic sign results in an increase in the bits stored in the register, the new indicated bit count is determined by adding a 3 to the current indicated bit count; whereas the new indicated bit count is formed by adding a 1 to the current indicated bit count when the sign change results in a net decrease in the number of bits in the register.

The signal at the output of AND circuit 63 is applied through OR circuit 68 and delay 69 to input 2 of binary adder 25 of Fig. 2E. The output of AND circuit 67 is applied through OR circuit 71 and delay 72 to input 2 of adder 26 of Fig. 2E. It was previously indicated that adder 25 effects a summation of inputs, each having a weighted value of 1 and that adder 26 effects a summation of inputs, each having a weight of 2. It was also noted hereinabove that the outputs of adders 25 and 26 are effectively applied to adders 10 and 29 and eventually to adder 11 whereby the sum modulo 4 of the signals applied to these adders are combined with the current indicated bit count appearing on terminals 441.17 so as to produce a new indicated bit count which appears on terminals 551.17.

4. ROUNDING OF REGISTER 1

Another instance in which the contents of Register 1 is altered such that the indicated bit count must be corrected occurs when a "rounding" operation is performed by the calculator. In the calculator a word is rounded by forcing a binary 1 bit into the 1 bit order of DP1 of Register 1. If the binary-decimal digit stored in DP1 is even-valued, the inclusion of the forced 1 will increase its value so that it becomes an odd-valued digit. However, if the digit stored in DP1 is initially an odd-valued digit, the inclusion of the forced 1 will not change the value of the digit.

Referring more particularly to Fig. 2C, the 1 bit order of DP1 of Register 1 appearing on the 1 bit terminal of the group 441.01 is connected through inverter 73 to input 2 of AND circuit 74. Input 1 of this AND circuit is connected to control terminal 015.03 which is Up for one microsecond when a rounding operation is to be performed. When this terminal is Up and the output of inverter 73 is Up (indicating the absence of a 1 bit in DP1 of Register 1), both of the inputs of AND circuit 74 are Up, thereby causing the output thereof to be Up. Thus, the output of AND circuit 74 is Up when the digit stored in DP1 is even-valued and a rounding operation is to be performed.

The output of AND circuit 74 is applied to input 2 of each of the OR circuits 68 and 71. The application of a one microsecond pulse to each of the OR circuits 68 and 71 causes delays 69 and 72, respectively, to produce one microsecond pulses which are applied to inputs 2 of adders 25 and 26, respectively of Fig. 2E. The pulses of the outputs of delays 69 and 72 are respectively assigned weights of 1 and 2.

When the digit stored in DP1 is even-valued and a rounding operation is to be performed, an additional 1 bit is added to Register 1. In accordance with the first rule set forth hereinbefore, the indicated bit count in the case of a rounding operation is corrected by obtaining the sum of the 4's complement of the number of bits added to the register and the current indicated bit count. That is, the 4's complement of 1 is 3, which accounts for the fact that the outputs of delays 69 and 72 must be Up in response to the operation of AND circuit 74.

With respect to Fig. 2C, it should be noted that a rounding operation must not take place simultaneously with an algebraic sign change since both of these functions utilize OR circuits 68 and 71 and delays 69 and 72. The weight values represented by pulses at the outputs of delays 69 and 72 in response to the operation described hereinabove are added to the summation of values weighted 1 and 2 which takes place within the binary adders of Fig. 2E. Thus, the correction factor generated by the rounding operation is added to the previous indicated bit count so as to produce the corrected indicated bit count on terminals 551.17.

5. INDEX CHANGES IN REGISTER 1

As stated previously, the index is stored in DP15 and DP16 of Register 1, and is the power of 10 by which the number located in DP1–DP13 must be multiplied in order to obtain the correct value. The contents of DP15 and DP16 of Register 1 is referred to herein as Index 1. The decimal point of the number stored in DP1–DP13 is arbitrarily assumed to be located between DP12 and DP13 of the register. In application 8 is disclosed a method by which the index of a register may be changed which includes a "Plus and Minus 1 Adder" connected to a position of a register. In this system the index is increased or decreased in a step by step fashion where each step has a decimal value of 1. For example, if the index is to be changed from 28 to 31, it is changed in the fashion 28, 29, 30 and 31, which requires four microseconds to complete the operation. When the index of a register is increased or decreased by the procedure disclosed in application 8, the total number of binary 1's located in Register 1 may be increased or decreased as a result of each index change. Thus, the Register 1 bit computer of Figs. 2A-2E must be cognizant of changes made in each digit of the index.

The circuits of the bit inventory computer which relate to sensing changes in the index of Register 1 are predominantly located in Figs. 2A and 2B. Referring to Fig. 2A, control terminals 026.05 and 026.06 are illustrated. Terminal 026.05 is caused to be Up one microsecond for each step that Index 1 is increased. On the other hand, terminal 026.06 is Up one microsecond for each step that Index 1 is decreased. Thus, in the example where Index 1 is increased from 28 to 31, control terminal 026.05 is Up for four microseconds. But, if Index 1 were being decreased from 31 to 28, terminal 026.06 must be Up for an interval of four microseconds. Terminals 026.05 and 026.06 are never Up simultaneously.

Control terminal 451.01 of Fig. 2A is arranged to be Up when DP15 of Register 1 contains a 0. The signal appearing on this terminal is used by the circuit of Figs. 2A and 2B to sense a contemplated increase or decrease of the tens order of the index as a result of the units order thereof passing from 9 to 0, or from 0 to 9, respectively.

The circuit of Figs. 2A and 2B operate in accordance with the first and second rules recited previously, which relate to a net increase or net decrease of the number of bits stored in Register 1. In satisfaction of these rules, it will be shown hereinbelow that a pulse on lead 551.01 of Fig. 2A is assigned a weighted value of 1, and pulses on leads 551.02 and 551.03 of Fig. 2B are respectively assigned weighted values of 2 and 3. The correction factor which is generated as a result of a change in the index collectively appears on the leads 551.01, 551.02 and 551.03.

The pulses comprising the correction factor appearing on leads 551.01, 551.03 and 551.02 are respectively applied to delays 81-83 of Fig. 2C. The outputs of delays 81 and 83 are respectively applied to OR circuits 84 and 85 and the output of delay 82 is applied to both of these OR circuits. The outputs of OR circuits 84 and 85 are respectively assigned weights of 1 and 2 and are respectively connected to inputs 1 of binary adders 25 and 26 of Fig. 2E. Accordingly, when the correction factor includes a weight of 1 and a weight of 2, the outputs of both of the OR circuits 84 and 85 are caused to be Up for one microsecond; whereas, the output of OR circuit 84 is Up when the correction factor contains only a weight of 1, and the output of OR circuit 85 is Up when the index correction factor contains only a weight of 2.

The value of the index correction factor, which must be added to the current indicated bit count in order to determine the corrected indicated bit count when an index charge is involved, can be determined from Table I hereinbelow. Referring to Table I, the extreme left-hand column thereof relates to the type of change being made in the index, that is, whether the index is being increased or decreased by a value of 1. The remaining three columns of Table I indicate the current value of the index. Thus, where the current value of the index is found in the first of said three columns, the correction factor equals 1. Similarly, if the current value of the index is found in the second or third of said three columns, the correction factor is equal to 2 or 3, respectively.

As an example, where the current value of the index is 29 and is to be increased by 1 during the next subsequent microsecond, the correction factor is equal to 1. Similarly, if the current value of the index is 29 and it is to be decreased by 1, the correction factor equals 1, as indicated by the fact that the index X9 is found in the lower portion of the first of the three correction factor columns. The term X9 as used herein implies that the tens order of the number may be of any value, and the units order thereof is the digit stated.

Table I
CORRECTION FACTORS REQUIRED DUE TO INDEX CHANGES

| Index Change | Value of Current Index | | |
| --- | --- | --- | --- |
| | Correction Factor of Weight 1 (Lead 551.01 is Up) | Correction Factor of Weight 2 (Lead 551.02 is Up) | Correction Factor of Weight 3 (Lead 551.03 is Up) |
| Increased by +1 (terminal 026.05 is Up) | X3 09 29 49 69 89 | X7 19 59 | X0 X2 X4 X6 X8 39 |
| Decreased by −1 (terminal 026.06 is Up) | X1 X3 X5 X7 X9 40 | X8 20 60 | X4 10 30 50 70 90 |

It will be seen presently that the circuit of Figs. 2A and 2B are operative to supply the correction factors listed in Table I when the stated index is present and is to be increased or decreased by 1. It should be noted that when the index is equal to a number not listed in Table I, the change thereof does not involve an increase or a decrease in the number of bits stored in Register 1.

Referring to Fig. 2A, the digits of Index 1 contained in DP15 and DP16 of Register 1, respectively, appear on the terminals 441.15 and 441.16. Each of these terminals and the leads connected thereto represent four terminals or leads which accommodate the 1, 2, 4 and 8 bits of the digit applied thereto.

The terminal accommodating the 4 bit of terminals 441.15 is applied to inverter 88, the output of which is applied to input 1 of AND circuit 89. The terminal accommodating the 1 bit of terminals 441.15 is applied to input 2 of AND circuit 89. Thus, coincidence occurs within this AND circuit, thereby causing input 1 of switch 90 to be Up when the digit in DP15 of Register 1 contains a 1 bit but no 4 bit. Input 2 of switch 90 is connected to the 2 bit terminal of the group 441.15. Coincidence occurs between inputs 1 and 2 of 2-position switch 90 whenever the units order of the index (DP15) is a 3 (contains a 1 bit and a 2 bit but no 4 bit).

The 1 bit terminal of the group 441.16 (tens order of the index) is applied through inverter 91 to input 3 of switch 90. Input 3 of switch 90 is Up when the tens order of the index is even-valued. The 1 bit and 8 bit terminals of the group 441.15 are respectively applied to inputs 1 and 2 of AND circuit 92, and the output thereof is connected to input 4 of switch 90. Inputs 3 and 4 of switch 90 are both Up when the Index 1 stored is 09, 29, 49, 69 or 89.

The output of 2-position switch 90 of Fig. 2A is applied to input 1 of 2-position switch 93. Control terminal 026.05 is applied to input 2 of this switch. As stated previously, this control terminal is Up when the Index 1 is increased by a value of 1. Accordingly, inputs 1 and 2 of switch 93 are Up simultaneously whenever the current value of the index is X3, 09, 29, 49, 69 or 89, and the index is to be increased by a value of 1 during the next subsequent microsecond time interval. The coincidence occurring between inputs 1 and 2 of switch 93 causes the output thereof to be Up, so that a pulse (assigned a weight of 1) appears on lead 551.01 and is applied to delay 81 of Fig. 2C as a part of the index correction factor referred to previously.

The 1 bit terminal of DP15 is applied to inputs 1 and 2 of 2-position switch 94 of Fig. 2A. Accordingly, coincidence occurs between inputs 1 and 2 of this switch so as to cause the output thereof to be Up whenever the index is X1, X3, X5, X7 or X9.

The 2 bit terminal of group 441.16 is applied through inverter 95 to input 1 of AND circuit 96. The output of the inverter is Up when the tens order of the index does not contain a 2 bit. Input 2 of AND circuit 96 receives the output of inverter 91 which is Up when the tens order of Index 1 does not contain a 1 bit, i.e., is even-valued. Input 3 of said AND circuit is connected directly to the 4 bit terminal of the group 441.16. Coincidence occurs among the 3 inputs of AND circuit 96 and thereby causes the output of this unit to be Up only when the tens order of the index is the digit 4. The output of AND circuit 96 is applied to input 3 of switch 94 and a signal appearing on control terminal 451.01 is applied to input 4 thereof. As stated earlier, terminal 451.01 is Up when the units order of the Index 1 (DP15 of Register 1) is storing the digit 0. It is now evident that inputs 3 and 4 of switch 94 are Up simultaneously as to cause the output of this switch to be Up when the Index 1 is 40.

The signal applied to control terminal 026.06 is applied to input 3 of switch 93, and input 4 thereof receives the output of 2-position switch 94. It was noted hereinabove that terminal 026.06 is Up when Index 1 is to be decreased by a value of 1. Thus, inputs 3 and 4 of switch 93 are Up simultaneously when the current value of Index 1 is X1, X3, X5, X7, X9 or 40 and is to be decreased by a value of 1. When inputs 3 and 4 of switch 93 are Up simultaneously, the output thereof is Up so as to represent a weight of 1. The conditions under which the correction factor contains a weight of 1 are presented in Table I above.

Referring to Fig. 2B, the 1 bit terminal of the group 441.15 is applied through inverter 100 to inputs 1 and 2 of the 2-position switch 101. Coincidence occurs within this switch when inputs 1 and 2 thereof are Up as a result of the units order of Index 1 being even-valued; that is, equal to X0, X2, X4, X6 or X8. This condition causes the output of the switch to be Up.

The 1 and 2 bit terminals of the tens order of Index 1 are respectively connected to inputs 1 and 2 of AND circuit 102. The 4 bit terminal of the group 441.16 is applied through inverter 103 to input 3 of the AND circuit. Coincidence occurs within AND circuit 102 when the tens order of Index 1 contains a 1 and a 2 bit but no 4 bit which occurs only when DP16 contains a 3. The output of AND circuit 102 is applied to input 3 of switch 101 and the output of AND circuit 92 of Fig. 2A (Up when Index 1 is X9) is applied to input 4 of this switch. Hence, inputs 3 and 4 of switch 101 are Up simultaneously when Index 1 is 39.

Input 1 of switch 104 receives the output of switch 101 which is Up when Index 1 is X0, X2, X4, X6, X8 or 39. Input 2 of switch 104 is Up when terminal 026.05 is Up (Index 1 to be increased by 1). Coincidence between inputs 1 and 2 of switch 104 causes the output thereof and lead 551.03 to be Up. The signal on lead 551.03 (weight of 3) represents a portion of the index correction factor and is applied to delay circuit 82 of Fig. 2C as noted previously.

The terminal accommodating the 4 bit of the units order of Index 1 is applied to input 1 of AND circuit 105 of Fig. 2B. Input 2 of this AND circuit receives the output of inverter 100 which is Up when the units order of Index 1 is even-valued (does not contain a 1 bit). The 2 bit terminal of the group 441.15 is applied through inverter 106 to input 3 of AND circuit 105 and is Up when DP15 of the register does not contain a 2 bit. Coincidence occurs within AND circuit 105 when Index 1 is X4. The output of this AND circuit is applied to input 4 of 2-position switch 104.

The 1 bit terminal of the group 441.16 is connected to input 1 of AND circuit 107, and control terminal 451.01 is connected to input 2 thereof. Thus, AND circuit 107 is operated when the tens order of the index is odd-valued and the units order thereof is equal to 0. The outputs of AND circuits 107 and 105 are connected in a common cathode OR circuit arrangement which is indicated by the abbreviation CCOR. The common cathode OR circuit constitutes an arrangement disclosed in application 2, wherein the outputs of both of the AND circuits utilizing a common cathode load resistor such that coincidence within either AND circuit causes the common output to be Up.

The common output of AND circuits 105 and 107 is connected to input 4 of switch 104, and is Up when Index 1 equals X4, 10, 30, 50, 70 or 90. Input 3 of this switch receives the signal appearing on control terminal 026.06. Coincidence occurs between inputs 3 and 4 of switch 104 and the output thereof is Up when the current value of the index is X4, 10, 30, 50, 70 or 90, and Index 1 is to be decreased by 1 during the next subsequent microsecond time interval. Again, it should be noted that Table I presents the instances when the index correction factor has a total weight of 3.

Inputs 1, 2 and 3 of AND circuit 109 of Fig. 2B are respectively connected to the 1, 2 and 4 bit terminals of the group 441.15 (units order of Index 1). Hence, the output of this AND circuit is Up when Index 1 is X7. The output of this AND circuit is connected through a common cathode OR circuit arrangement to input 1 of switch 110.

The terminal accommodating the 8 bit of the tens order of the index (terminals 441.16) is applied through inverter 111 to input 1 of AND circuit 112. Input 2 of this AND circuit receives the output of inverter 95 which is Up when the tens order does not contain a 2 bit, and input 3 receives the signal on the 1 bit terminal of the group 441.16 (tens order). Coincidence occurs within AND circuit 112 and the output thereof is Up when the tens order of the index is 1 or 5. The output of this AND circuit is applied to input 1 of AND circuit 113. Input 2 of the latter unit receives the output of AND circuit 92 of Fig. 2A which is Up when Index 1 is X9. Consequently, the output of AND circuit 113 is Up when Index 1 is 19 or 59.

The outputs of AND circuits 109 and 113 are connected together in a common cathode OR circuit arrangement and to input 1 of switch 110 and are Up when Index 1 is X7, 19 or 59. Input 2 of this switch receives the control signal applied to terminal 026.05. Hence, coincidence occurs between inputs 1 and 2 of switch 110 so as to cause the output thereof to be Up when Index 1 is X7, 19 or 59 and is to be increased by 1 during the next microsecond interval.

Input 1 of AND circuit 114 of Fig. 2B is Up when the output of inverter 100 is Up (units order of Index 1 is even-valued). Input 2 of this AND circuit is connected to the 8 bit terminal of the group 441.15. Thus, coincidence occurs within AND circuit 114 and the output thereof is Up when Index 1 is X8.

Input 1 of AND circuit 115 receives the output of inverter 91 of Fig. 2A which is Up when the tens order of Index 1 is even-valued. Input 2 of this AND circuit is Up when the 2 bit terminal of the group 441.16, representing the tens order, is Up. Input 3 of AND circuit 115 receives the signal on control terminal 451.01 (Up when Index 1 is X0). Accordingly, coincidence occurs within AND circuit 115 causing the output to be Up, when Index 1 is 20 or 60.

The outputs of AND circuits 114 and 115 are connected together in a comon cathode OR circuit arrangement to input 4 of switch 110. Input 3 of this switch is connected to terminal 026.06. Thus, inputs 3 and 4 of switch 110 are Up simultaneously, thereby causing the output thereof to be Up when Index 1 is X8, 20 or 60 and is to be decreased by 1 during the next microsecond interval. The output of switch 110, when Up, contributes a weighted value of 2 to the index correction factor referred to previously.

An index correction factor may be formed and applied to the binary adders of Fig. 2E during the same time interval that a correction factor generated as a result of an algebraic sign change, a rounding operation, or an entry or exit of a digit in the register, is applied to these adders. In other words, two or more correction factors may be simultaneously combined with the current indicated bit count to obtain the corrected indicated bit count. This feature of the invention permits the corrected indicated bit count to be computed even though the bit compositions of a plurality of orders or digit positions of a data word are being altered simultaneously.

6. REGISTER 2 BIT INVENTORY COMPUTER

Referring more particularly to Figs. 3A–3C, the circuit diagram of the Register 2 Bit Inventory Computer is illustrated. The function of this circuit is to maintain the correct indicated bit count in DP17 of Register 2 as the contents of one or more of positions DP1–DP16 of this register is altered. The function and operation of the Register 2 Bit Inventory Computer is similar to the Register 1 Bit Inventry Computer described hereinabove.

With respect to Register 2 of Fig. 1, there are in general two instances wherein the stored information is altered, thereby requiring that the indicated bit count be corrected. The first situation which requires that the indicated bit count be corrected occurs when binary-decimal digits are shifted into or out of Register 2. The shifting of this register is such that a digit can be lost or gained only via positions DP1, DP13 and DP16. The second situation arises when the index of a data word is changed. The index of the data word in Register 2 is stored in DP15 and DP16 thereof, and is referred to herein as Index 2.

The circuit of the bit inventory computer of Figs. 3A–3C operates in accordance with the same two rules set forth hereinbefore. The first rule stated that the corrected indicated bit count is produced by adding the 4's complement of the net bit increase modulo 4 to the current indicated bit count. The second rule stated that when the register suffers a net decrease in the number of binary 1 bits stored therein, the corrected indicated bit count is computed by obtaining the sum modulo 4 of the number of bits removed from the register and the current indicated bit count.

In Figs. 3A–3C, the components which are similar to components of the Register 1 Bit Inventory Computer of Figs. 2A–2E bear corresponding reference characters having a suffix A. For example, delay circuits 81A–83A of Fig. 3B accomplish a function similar to delay circuits 81–83 of Fig. 2B.

7. CHANGES IN DATA DUE TO SHIFTING REGISTER 2

Referring more particularly to Fig. 3B, the 4-pole 3-position switch 15A receives each digit which may be discharged from Register 2 as a result of its being shifted. Thus switch 15A accommodates bits representing a net decrease in the number of bits stored in Register 2.

Input 1 of switch 15A is connected to terminals 442.16 of Fig. 3A upon which appear each digit left-shifted out of DP16. Such a digit is gated through switch 15A only when control terminal 042.06 of Fig. 3B is Up. This terminal is Up only when the actuation of the manual keyboard circuits cause DP1–DP16 of Register 2 to be left-shifted.

Terminals 442.13 are the output of DP13 of Register 2 and are connected to input 2 of switch 15A. A digit appearing on terminals 442.13 is gated through switch 15A when control terminal 042.07 is Up. This terminal is Up when the calculator causes DP1–DP13 of the register to be left-shifted such that a digit may be shifted out of DP13.

Digital information may be removed from Register 2 by being right-shifted out of DP1 thereof. The output of DP1 appears on terminals 442.01 of Fig. 3B and is applied to input 3 of switch 15A. When control terminal 042.09 is Up the digit appearing on terminals 442.01 is permitted to pass through switch 15A.

Only one of the control terminals 042.06, 042.07 and 042.09 is Up during any particular microsecond interval. The binary bits representing the digit gated through switch 15A are applied to the delay circuits 16A–19A, which serve to reshape the waveforms thereof. Delays 16A–19A, respectively, accommodate the 1, 2, 4 and 8 bits of a binary-decimal digit.

The outputs of delays 16A and 17A are applied to inputs 1 and 2 of binary adder 20, whereas the outputs of delays 17–19 are respectively applied to the inputs 1–3 of the digit check circuit 21A. The lefthand output of digit check 21A (Up when a 4 or an 8 bit is present) is applied to input 3 of binary adder 20A. Accordingly, binary adder 20A effects a summation of the bits removed from the register. The sum and carry outputs of adder 20, respectively assigned weights of 1 and 2, are connected to inputs 2 and 3 of adders 25A and 26A, respectively.

The matrix of binary adders 25A and 26A, delay circuits 27A, 28A and 30A, and adders 10A, 11A and 29A are connected similar to the correspondingly labelled units of Figs. 2B and 2E. These adders and delay circuits are provided to effect a summation modulo 4 of the computed correction factor and the current indicated bit count. It is to be noted that the current indicated bit count appears on two terminals of the group 442.17 of Figs. 2A and 2B, which accommodate the 1 and 2 bits of DP17 of Register 2. These terminals are connected to adders 10A and 11A of Fig. 3B. The corrected indicated bit count appears on terminals 552.17 of Fig. 3B which constitute an input of DP17 of Register 2.

The 4-pole 4-position switch 32A of Fig. 3C receives digits which are shifted into Register 2 and thus, cause an increase in the number of bits stored therein. Briefly, signals representing the net bit increase are applied to delays 33A–36A and are thereafter applied to the 4's complement binary adder 40A. The output of adder 40A, having a weight of 1, is applied to input 2 of binary adder 10A and the output, having a weight of 2, is applied to input 3 of binary adder 29A. Thus, the correction factor appearing at the outputs of the 4's complement binary adder is added within the adders of Fig. 3B to the current indicated bit count so as to obtain the corrected indicated bit count.

During a division problem the digits of the quotient are left-shifted into DP1. The control signal on terminal 010.07 permits the newly entered digit in DP1 to be gated into switch 32A by means of input 1 thereof.

The product generated during a multiplication problem appears digit-by-digit on terminals 333.01 of Fig. 3C which are connected to input 2 of switch 32A. These digits are gated through the switch when a positive signal on terminal 009.05 causes control input 2 of switch 32A to be Up.

During certain operations, the digit located in DP1 of Register 1 is right-shifted into DP13 of Register 2. This digit appears on terminals 441.01 and is applied to input 3 of switch 32A. Control input 3 is Up when terminal 042.05 is Up thereby gating said digit through the switch.

A digit to be entered into DP1 of Register 2 from the manual keyboard appears on terminals 776.01 and is applied to input 4 of switch 32A. This digit is gated through the switch when terminal 042.06 (Fig. 3B) is Up. The 8 and 4 bit of a digit present on terminals 776.01 are applied to inputs 1 and 2 respectively of AND circuit 38A, the output of which is applied to input 1 of OR circuit 44A.

The 4's complement binary adder 40 of Fig. 3C functions in a manner similar to that described hereinabove for the 4's complement binary adder of Fig. 2E. That is, the signals at the output of adder 40A represent the 4's complement of the number of bits applied to the inputs thereof.

8. INDEX CHANGES IN REGISTER 2

The method by which the indicated bit count is modified in the case of Index 2 of Register 2 is similar to that described above with respect to Index 1 and the circuits of Figs. 2A and 2B. The circuit which determines the index correction factor resulting from an alteration of Index 2 is illustrated in Fig. 3A.

The units order of Index 2 appears on terminals 442.15 and the tens order thereof appears on terminals 442.16. Terminal 026.09 is Up for one microsecond when Index 2 is to be increased by a value of one. Terminal 026.10 is Up for one microsecond when Index 2 is to be decreased by a value of one. Terminal 452.03 of Fig. 3A is Up when the units order (DP15) of Index 2 is equal to zero.

As stated above, the circuit of Fig. 3A is connected similarly to the circuit of Figs. 2A and 2B with the exception that Fig. 3A accommodates Index 2 of DP15–DP16 of Register 2. Accordingly, when the output of switch 93A is Up, a pulse having a weight of one is applied by lead 552.01 to delay 81A of Fig. 3B. A positive signal at the output of 104A is assigned a weight of 3 and is applied by lead 552.03 to delay 82A. When the output of switch 110A is Up, a signal assigned a weight of 2 is applied by lead 552.02 to delay 83A.

Referring to Fig. 3B, the output of delay 81A is applied to input 1 of adder 25A, the output of delay 82A is applied to input 3 of adder 25A, and the output of delay 83A is applied to input 1 of adder 26A. Thus, the index correction factor appearing on leads 552.01–552.03 is applied through delays 81A–83A to adders 25A and 26A. The purpose of adder 25A is to provide a summation of a plurality of signals each of weight one, whereas adder 26A effects a summation modulo 4 of a plurality of signals each of weight 2. The outputs of these adders are applied to the remaining delays and binary adders of Fig. 3B so as to cause the corrected indicated bit count to appear on terminals 552.17.

The correction factor which must be supplied by the circuit of Fig. 3A in response to an alteration of Index 2 can be determined from Table I hereinabove. When using Table I in conjunction with Index 2, the extreme right-hand column is related to lead 552.03 (Fig. 3A), the second column is related to lead 552.02 (Fig. 3A) and the third column is related to lead 552.01 (Fig. 3A).

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intension, therefore, to be limited only as indicated by the scope of the following claims.

What is claimed is:

1. A bit inventory computer for correctly maintaining the value of a check digit associated with a multi-digit word, each being expressed in binary notation wherein the quantity of binary 1's in said word is altered as a result of binary 1's being added to or removed from said word comprising means producing representations of binary 1's added to and removed from said word, means responsive to representations of all binary 1's removed from said word including means for generating a first correction factor related to said binary 1's discharged; means responsive to representations of all binary 1's added to said word including circuit means for generating a second correction factor related to said binary 1's added; and means connected to receive said check digit and said first and second correction factors and including arithmetic means responsive thereto to produce a corrected check digit, said first correction factor having a decimal equivalent value equal to the sum modulo 4 of the number of binary 1's removed from said word, said second correction factor having a decimal equivalent value equal to the 4's complement of the sum modulo 4 of the number of binary 1's added to said word, and said last-mentioned means includes a plurality of binary adders connected to effect a sum modulo 4.

2. In an information handling system, first means storing a first group of information signals, second means storing a second group of information signals bearing a predetermined relationship to said first group, first circuit means controlling said first means for adding to and removing information signals from said first group to thereby alter the quantity of said signals, third means responsive to said first circuit means for sensing signals simultaneously added to and removed from said first group to arithmetically produce a third group of information signals, and second circuit means responsive to said second means and said third means for receiving and combining said second and third groups to produce a fourth group of information signals bearing said predetermined relationship to the resultant composition of said first group, said fourth group being applied to said second means to thus replace said second group, the signals of said second group having arbitrarily assigned weighted values of 1 and 2, the signals added to and removed from said first group each having assigned a weighted value of 1, the signals of said third group having arbitrarily assigned weighted values of 1 and 2, and said second circuit means including binary adders for individually effecting a summation modulo 4 of all signals weighted 1 and all signals weighted 2 to thereby produce said fourth group of information signals.

3. In an information handling system, first means storing a first group of information signals, second means storing a second group of information signals bearing a predetermined relationship to said first group, first circuit means controlling said first means for adding to and removing information signals from said first group to thereby alter the quantity of said signals, third means responsive to said first circuit means for sensing signals simultaneously added to and removed from said first group to arithmetically produce a third group of information signals, and second circuit means responsive to said second means and said third means for receiving and combining said second and third groups to produce a fourth group of information signals bearing said predetermined relationship to the resultant composition of said first group, said fourth group being applied to said second means to thus replace said second group, said third group of information signals being formed by effecting a sum modulo 4 of the decimal value of the number of signals removed from said first group and the decimal value of the 4's complement of the number of signals added to said first group.

4. In a pulse-coded information system, means manifesting information by a plurality of coded pulses, means manifesting a check indicator by coded pulses having a coded value equal to the 3's complement of the sum modulo 4 of the number of pulses representing said information, means for altering said information, means responsive solely to anticipated alterations of said information to produce a plurality of coded pulses indicative of a correction factor, and means receiving correction factor pulses and indicator pulses to effect a sum modulo 4 thereof represented by a plurality of coded pulses which constitute a new check indicator.

5. A computer for correcting an indicator associated with a multi-order digital word having a given number of digital orders, said indicator and said word each exhibiting a plurality of electrical representations, means to represent said indicator by two electrical representations having decimal equivalent weights of 1 and 2 respectively derived from the number of electrical representations comprising said word, means receiving indications of alterations in the value of selected orders of said word, means operative to provide an indication in response to a net decrease in the number of said electrical representations of said word, means for adding the original indicator and said indication of the net decrease to produce a corrected indicator, and said means for adding including a plurality of binary adders producing a sum modulo 4.

6. A computing circuit for correctly maintaining a predetermined relationship between a check digit represented by indications having weights of 1 and 2 and the composition of a multi-digit word expressed in binary-decimal notation, comprising switching means receiving each digit to be discarded from said word, circuit means responsive to said switching means for producing an indication having a weight of 1 and an indication having a weight of 2, first adder means for effecting a summation of all indications of weight 1, second adder means for effecting a summation of all indications of weight 2, and means responsive to said first and second adder means for representing a new check digit whereby the new check digit is generated by monitoring only the digits of said word to be discarded.

7. A 4's complement adding device comprising, three input terminals each assigned a weight of 1; first and second output terminals respectively assigned weights of 1 and 2; first circuit means coupling said three input terminals and said first output terminal to energize the latter when one or all three of said inputs is energized, including means inhibiting the energization of said first output terminal when only two of said inputs are energized simultaneously; and second circuit means coupling said three inputs to said second output terminal to energize the latter when one or two of said three input terminals is energized, including means inhibiting the energization of said second output terminal when all three of said input terminals are energized simultaneously.

8. The adder of claim 7 wherein said first mentioned coupling means includes first means for indicating when any of the said inputs are energized, first coincidence circuit means for rendering an indication that not more than one of said three inputs is energized, second coincidence circuit means coupled to said first means and said first coincidence circuit means for energizing said first output terminal when only one of said three inputs is energized, and third coincidence circuit means for energizing said first output terminal when all three of said inputs are energized simultaneously.

9. The adder of claim 7 wherein said last mentioned coupling means includes first means for indicating when any of the said inputs are energized, second means for indicating that all three inputs are not being energized simultaneously, and coincidence circuit means responsive to said first means and said second means to energize said second output terminal when less than three of said input terminals are energized simultaneously.

10. A binary adder for producing the 4's complement of the number of binary 1's applied to the inputs thereof comprising, three pulse input terminals, first and second output terminals, OR circuit means responsive to pulses applied to said inputs, inverting coincidence circuit means coupled to said OR circuit means and operative only when at least two of said three input terminals each receive a pulse, second OR circuit means connected to said three inputs, coincidence circuit means coupled to said first output terminals and responsive to said second OR circuit means and said inverting coincidence circuit means to render a pulse at said first output terminal when only one of said input terminals receives a pulse, second inverting coincidence circuit means coupled to said three inputs and operative only when each of said three inputs receives a pulse, means coupling said second inverting coincidence circuit means and said first output terminal whereby the latter receives a pulse when each of said three inputs receives a pulse, and second coincidence circuit means coupling said second inverting circuit means and second OR circuit means to said second output terminal and operative to apply a pulse to said second output terminal when less than three of said three input terminals each receives a pulse.

11. In a pulse-coded information system, means manifesting information by a plurality of coded pulses, means manifesting a check indicator by coded pulses having a coded value equal to the sum of the number of pulses representing said information in a predetermined modulo expressed in the form of a complement, said complement being the complement of a number one less than said modulo, means for altering said information, means responsive solely to anticipated alterations of said information to produce a plurality of coded pulses indicative of a correction factor, and means receiving correction factor pulses and indicator pulses to effect a sum in said predetermined modulo thereof represented by a plurality of coded pulses which constitute a new check indicator.

12. In a pulse coded information system, apparatus for storing information in the form of a plurality of coded pulses; apparatus for manifesting a check indicator by coded pulses having a coded value equal to the sum of the number of pulses representing said stored information in a predetermined modulo expressed in the form of a complement, said complement being the complement of a number one less than said modulo; apparatus for changing said information; apparatus responsive to said information changing apparatus to produce a correction factor consisting of a plurality of coded pulses representing the sum expressed in said predetermined modulo of all pulses to be removed from said stored information, and to produce a correction factor consisting of a plurality of coded pulses expressing the sum of all pulses to be added to said stored information in terms of the complement of the sum in said predetermined modulo; and adding apparatus connected and arranged to receive said check indicator pulses and said correction factor pulses and operative to supply a sum thereof in said predetermined modulo represented by a plurality of coded pulses to form a new check indicator.

References Cited in the file of this patent

UNITED STATES PATENTS

| | | |
|---|---|---|
| 2,590,950 | Eckert et al. | Apr. 1, 1952 |
| 2,609,143 | Stibitz | Sept. 2, 1952 |
| 2,634,052 | Bloch | Apr. 7, 1953 |
| 2,653,996 | Wright | Sept. 29, 1953 |
| 2,759,669 | Knutsen | Aug. 21, 1956 |